United States Patent [19]

Hiroki et al.

[11] Patent Number: 4,868,672

[45] Date of Patent: Sep. 19, 1989

[54] IMAGE READING DEVICE HAVING A DOCUMENT HANDLING SYSTEM

[75] Inventors: Masashi Hiroki, Tokyo; Kunihiro Shibuya, Yokohama, both of Japan

[73] Assignee: Kabushiki Kaisha Toshiba, Kawasaki, Japan

[21] Appl. No.: 101,481

[22] Filed: Sep. 28, 1987

[30] Foreign Application Priority Data

Sep. 29, 1986 [JP] Japan ................................ 61-230698
Sep. 29, 1986 [JP] Japan ................................ 61-230699

[51] Int. Cl.$^4$ ......................... H04N 1/10; H04N 1/12
[52] U.S. Cl. ..................................... 358/494; 358/474
[58] Field of Search ........................ 358/285, 293, 294

[56] References Cited

FOREIGN PATENT DOCUMENTS

| 53-54031 | 5/1978 | Japan . | |
|---|---|---|---|
| 56-4975 | 1/1981 | Japan | 358/293 |
| 59-117370 | 7/1984 | Japan | 358/293 |
| 59-178076 | 10/1984 | Japan | 358/293 |
| 59-228465 | 12/1984 | Japan | 358/293 |
| 59-229967 | 12/1984 | Japan | 358/293 |
| 60-182861 | 9/1985 | Japan | 358/293 |
| 61-25357 | 2/1986 | Japan . | |
| 62-47266 | 2/1987 | Japan . | |
| 62-49773 | 3/1987 | Japan . | |
| 62-49774 | 3/1987 | Japan . | |

Primary Examiner—James J. Groody
Assistant Examiner—Randall S. Svihla
Attorney, Agent, or Firm—Cushman, Darby & Cushman

[57] ABSTRACT

An image reading device having a document handling system is suitable utilized on a modified standard office copier as electronic copying machine. In particular, the document presser plate is composed of a presser plate which is provided on the cabinet of the device. The document presser plate is held selectively over the exposure glass surface in two or more positions and used as the document feed tray in automatic document feed. When using this invention, the document presser plate functions as a document feed tray and a document dispense tray, there is no requirement for special feed and dispense trays. A compact and light-weight unit can therefore be achieved.

20 Claims, 36 Drawing Sheets

HOME POSITION
(SHADING CORRECTION POSITION)
(SENSOR OFF)

DOCUMENT FIXED MODE READING START POSITION
(SENSOR OFF)

ADF MODE READING POSITION
(SENSOR ON)

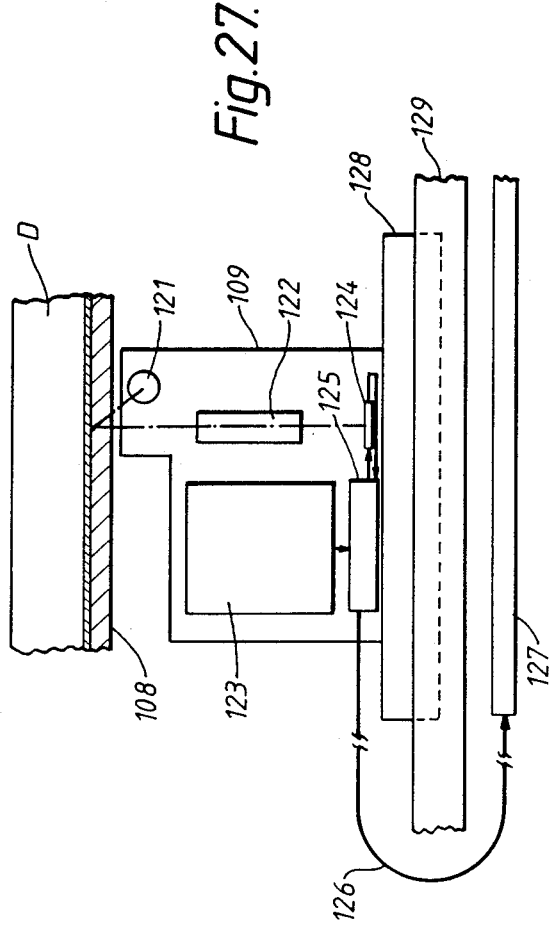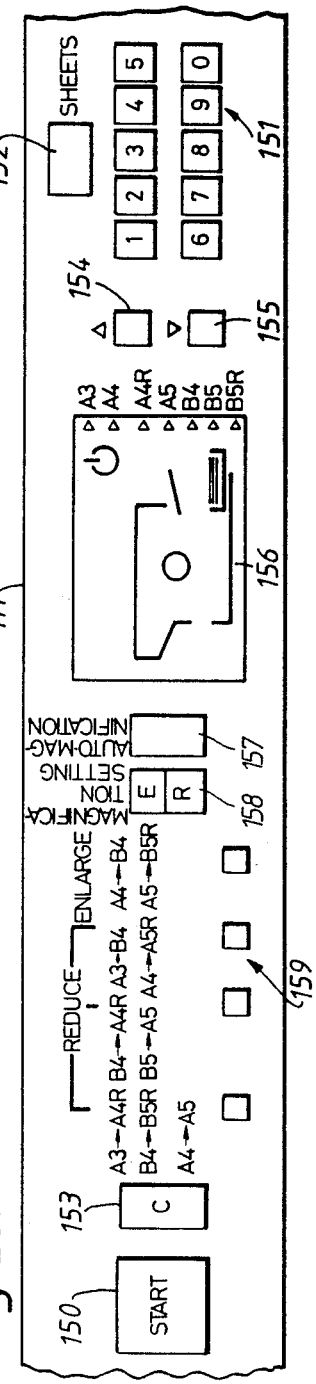
Fig.27.
Fig.28.

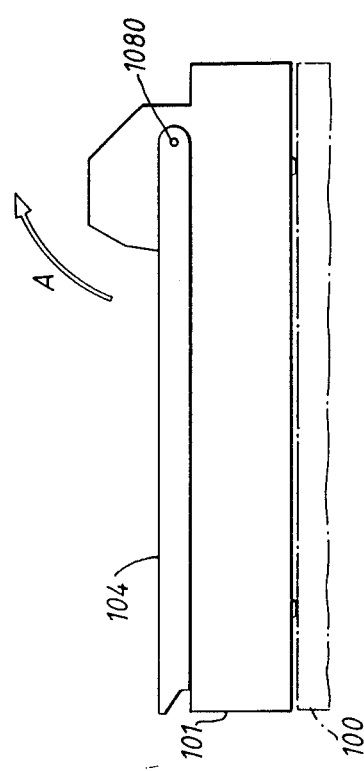
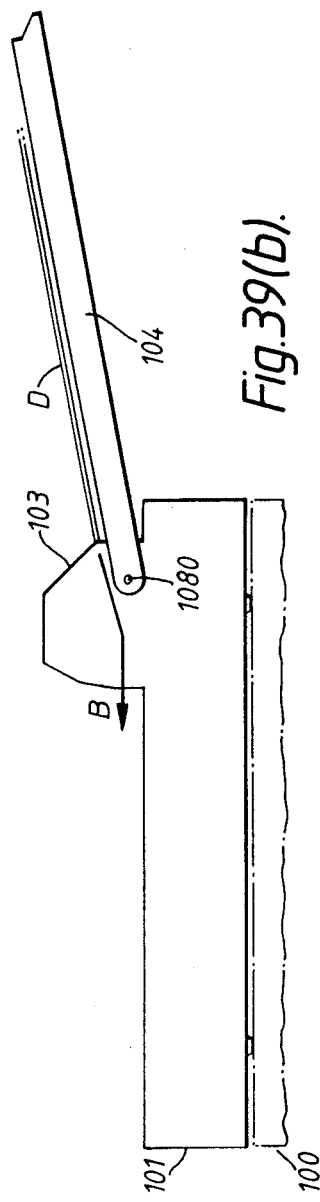

IMAGE READING DEVICE HAVING A DOCUMENT HANDLING SYSTEM

BACKGROUND OF THE INVENTION

1. Field of the Invention

This invention concerns an image reading device which is suitable for use in image forming devices such as electronic copying machines.

2. Discussion of Background

In conventional electronic copying machines, an automatic document feed device is installed by which, to obtain a copy of a document, when the document is placed on a document supply tray and the starting button is pressed, the document is automatically transported to the exposure glass and is dispensed to a dispense tray when the exposure has been completed. This automatic document feed device is designed so that it is free to open and close over the exposure glass surface and can be opened when copying a document, such as a book, which is not suitable for automatic feed.

When using a conventional electronic copier, it is necessary to have a document feed tray on which to place the documents to be copied and a dispense tray to receive the documents after completion of exposure. These trays are an obstacle to making the electronic copier more compact.

OBJECT OF THE INVENTION

The object of this invention is to provide an image reading device which does not require a special document feed tray and document dispense tray. That is to say, the object is to make a compact construction which in itself includes the document supply and dispense trays.

SUMMARY OF THE INVENTION

This invention is an image reading device which has the characteristic that, in an image reading device having a document transporter and a document presser plate, a holding device is provided to hold the document presser plate selectively in 2 or more positions. At one position of this holding device, when the document presser plate is held, this document presser plate is used as the document feed tray for the document transport device. In particular, the document presser plate is composed of a presser plate which is pivoted on the cabinet of the device. Moreover, the document transporter is provided with a document guide plate which guides the under surface of the document. Also, the upper surface of the document presser plate and the vicinity of the document guide plate are arranged to be slightly higher than the upper surface of the document guide plate.

That is to say, the document presser plate is held selectively over the exposure glass surface in 2 or more positions and is used as the document feed tray in automatic document feed.

When the document presser plate is in the automatic document feed mode, it is held in the automatic feed position, the documents are placed on the upper surface of the document presser plate, and the documents are fed in succession to the document reader unit from the upper surface of the document presser plate in this position.

BRIEF DESCRIPTION OF THE DRAWINGS

FIG. 27 is a structural drawing of the scanner unit.

FIG. 28 is a plan view of the operating panel.

FIG. 39(a) is a side elevation showing another embodiment of the automatic document feed device of this invention.

FIG. 39(b) is a side elevation when the automatic document feed device in FIG. 39(a) is in the document feed mode.

DETAILED DESCRIPTION OF THE PREFERRED EMBODIMENT

Figure 1:
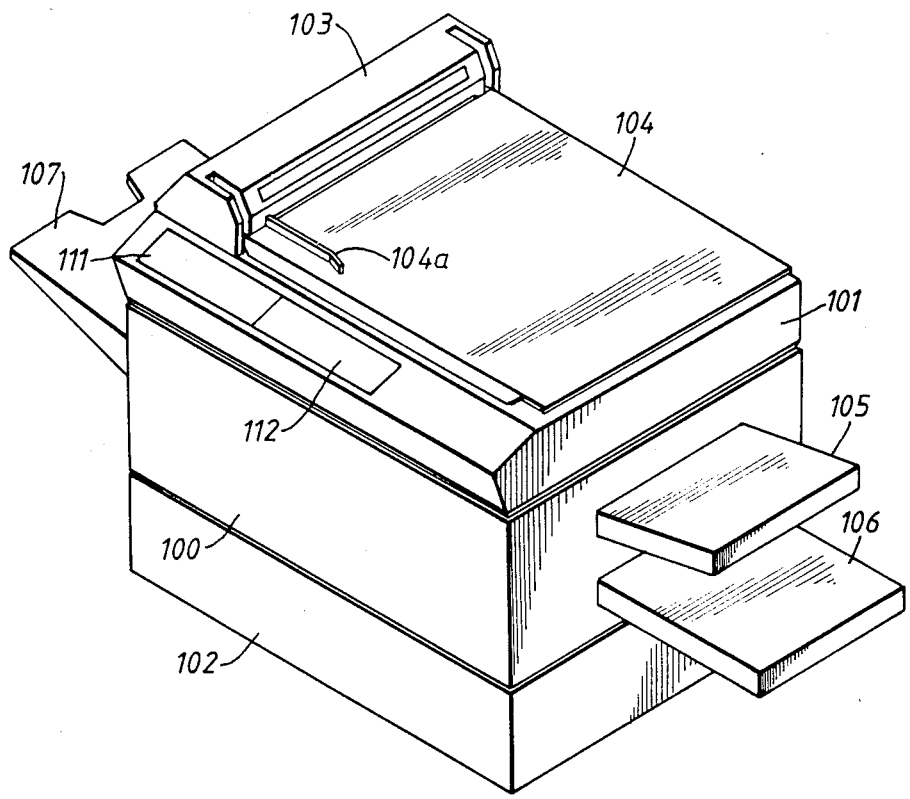
FIG. 1 is an oblique view of an electronic copying machine which uses an image reading device which is an embodiment of the invention.

In the case of the image reading device, that is to say, the electronic copying machine shown in FIG. 1, this copying machine is composed of a laser beam printer (LBP) unit 100, a camera unit, that is to say, a scanner unit (scanner) 101 provided on the top surface of this printer unit 100, and a control unit 102 provided below printer unit 100. An automatic document feed device (abbreviated as ADF) 103 is provided on the left hand side above scanner unit 101. Document presser plate 104, which can be opened and closed, is provided on top of scanner 101. Also, laser printer unit 100 is provided with paper feed trays 105 and 106, which are for paper of different sizes, and a dispense tray 107. Document feed guide 104a is provided on the upper surface of document presser plate 104.

Figure 2:
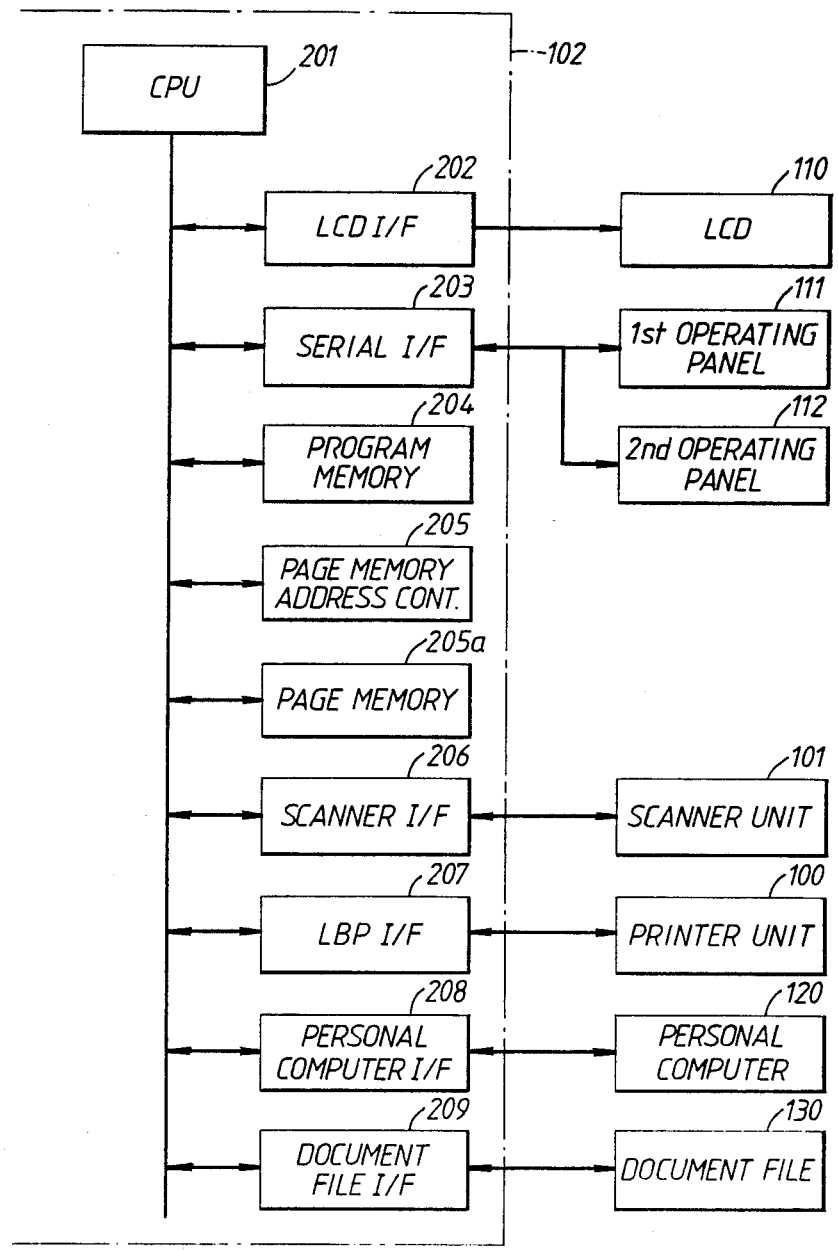
FIG. 2 is a block circuit diagram of the electronic copying machine.

FIG. 2 shows the circuit for the electronic copying machine in FIG. 1. Referring to this drawing, control unit 102 is provided with a CPU 201 for the overall control of the electronic copying machine. This CPU 201 is connected via a CPU bus to LCD interface 202, serial interface 203, program memory 204, page memory address controller 205 and page memory 205a. LCD interface 202 is connected to liquid crystal display (LCD) 110. Serial interface 203 is connected to 1st operating panel 111 and 2nd operating panel 112. 1st operating panel 111 is provided for inputting image editing information. Using this image editing information, page memory address controller 205 controls the reading and writing of image data by page memory 205a and thus carries out image editing. 2nd operating panel 112 is a normal copy operation unit which selects such items as number of copies and size of paper used.

The CPU bus of CPU 201 is also connected to scanner unit 101 via scanner interface 206, and at the same time it is connected to printer unit 100 via LBP interface 207. Furthermore, the CPU bus is connected to personal computer 120 and document file 130 via personal computer interface 208 and document file interface 209 respectively.

Figure 3:
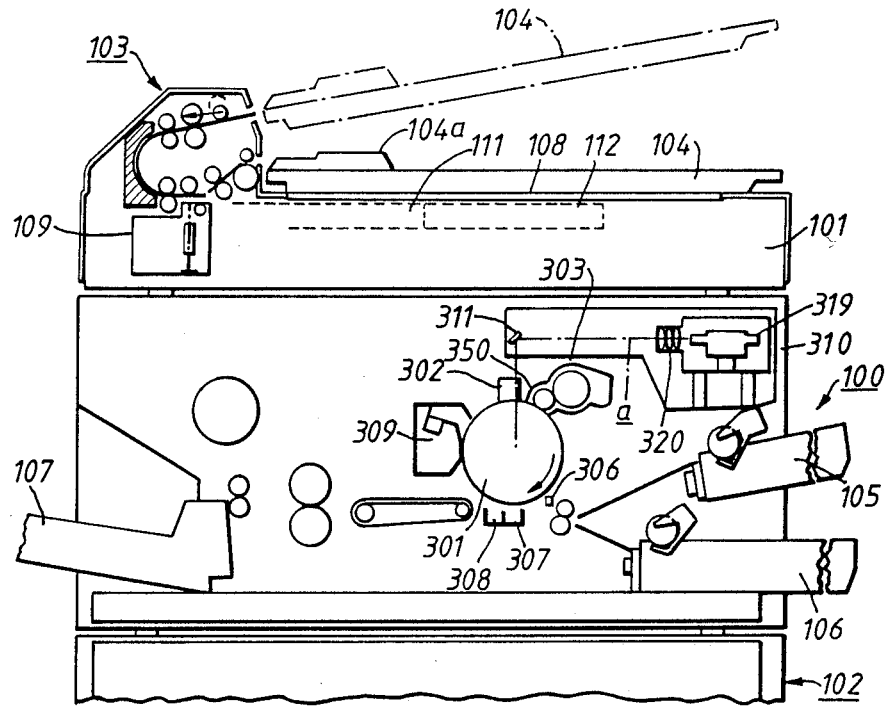
FIG. 3 shows the internal construction of the electronic copying machine.

FIG. 3 shows the construction of scanner unit 101, automatic document feed device 103 and laser beam printer unit 100. Scanner unit 101 has an exposure glass 108 and a document reading block 109 which can scan under exposure glass 108. 1st and 2nd operating panels 111 and 112 are provided on the front of scanner unit 101.

Figure 4:
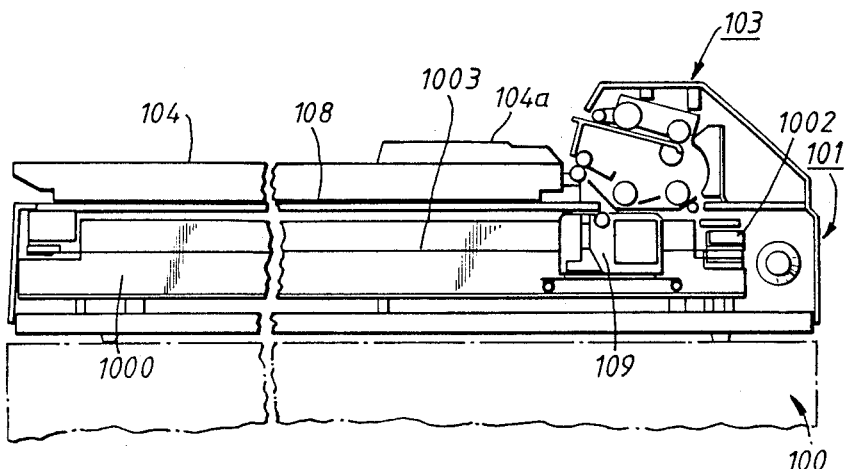
FIG. 4 is a cross-section showing the essential parts of an embodiment of this invention.
Figure 5:
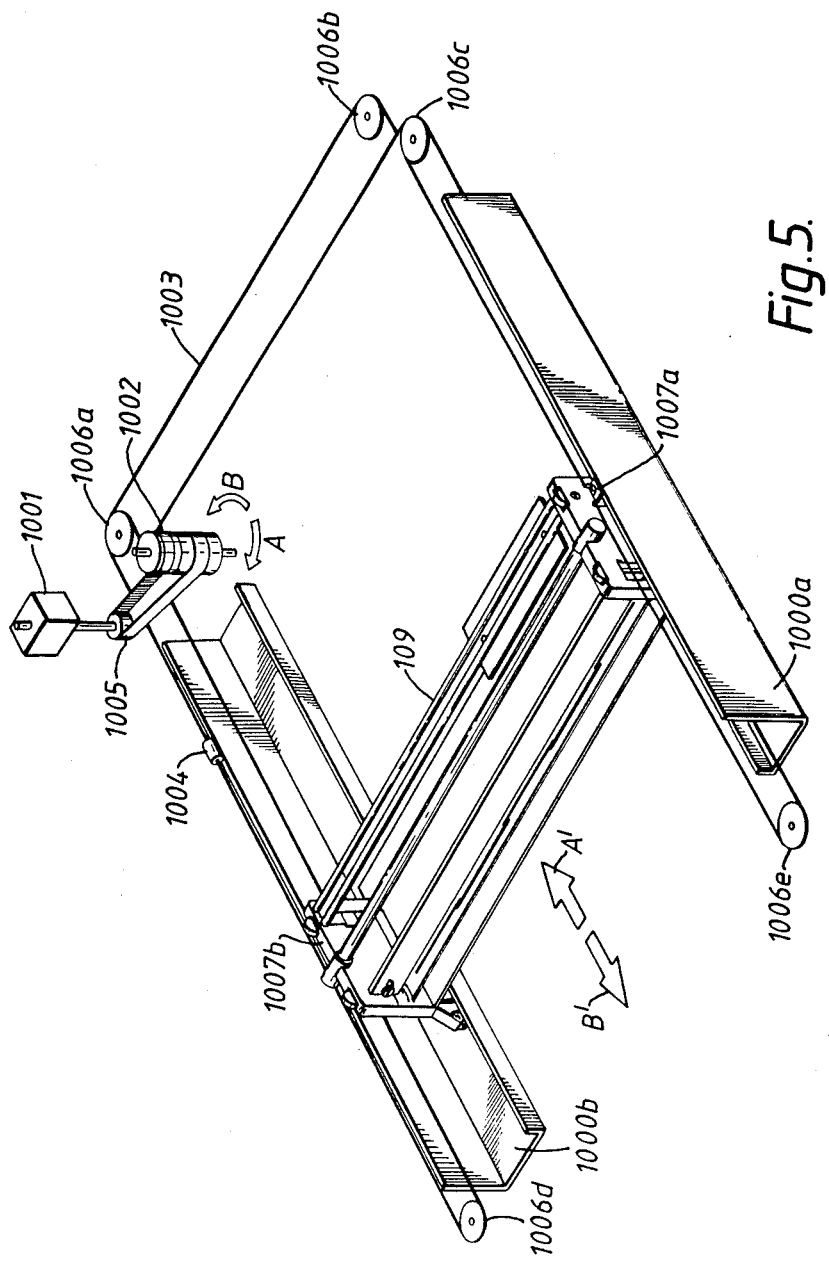
FIG. 5 is an oblique view showing the construction of the document reader unit.
Figure 6:
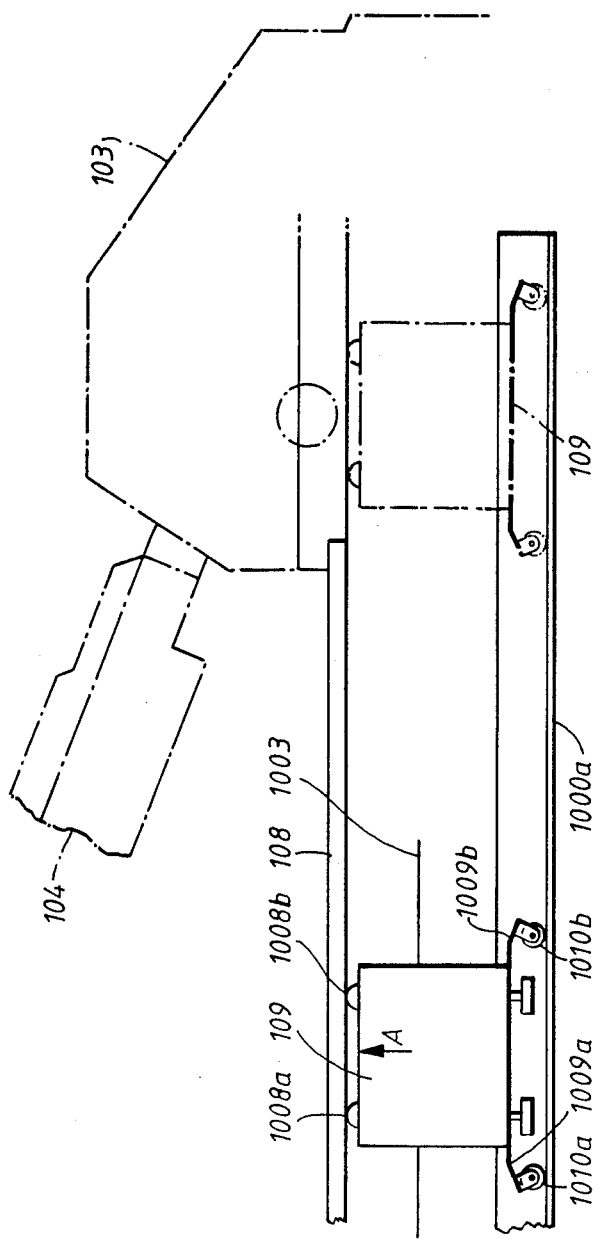
FIG. 6 is a side elevation illustrating the operational components of the document reader unit.
Figure 7:
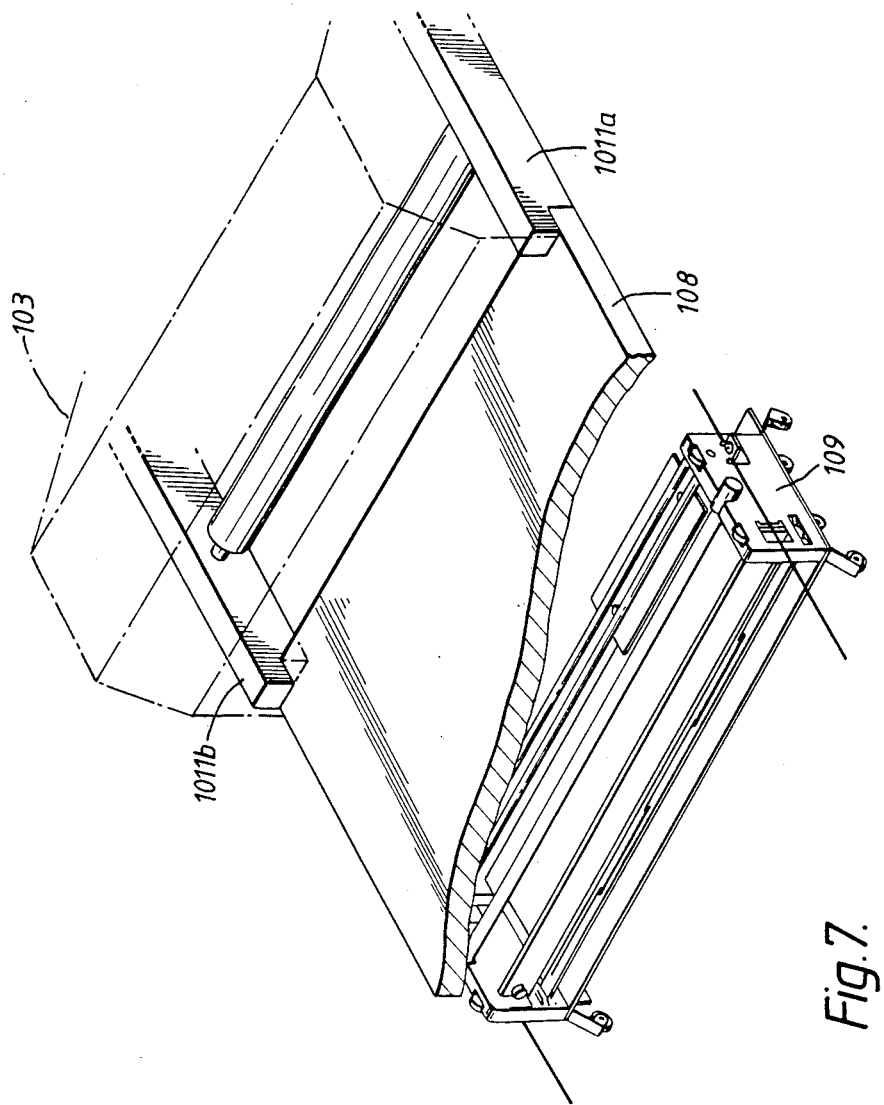
FIG. 7 is a partial cross-sectional oblique view showing the relationship between the document reader unit and the automatic document feed device.

FIG. 4 shows a partial simplified cross-section of scanner unit 101. This scanner unit 101 is mounted on top of printer unit 100 to which it is electrically connected. It reads the information from the document to be copied and copying is carried out by printer unit 100 based on the electrical signals which scanner unit 101 has read. Scanner unit 101 is mainly constructed from reading block 109, rail 1000, pulse motor 1001, shown in FIG. 5, driving pulley 1002, automatic document feed device (ADF unit) 103, exposure glass 108 and document presser plate (platen cover) 104. For the operating mechanism of this scanner unit 101, as shown in FIG. 5, a single wire 1003, which is connected by joint 1004 so that it is endless, is strung round guide pulleys 1006a–1006e and is connected to reading block 109 via securing points 1007a and 1007b. The mechanism is designed so that reading block 109 can slide on rails 1000a and 1000b through the movement of the wire 1003. This wire 1003 runs around driving pulley 1002 in the direction of arrow sign A or B by the forward or reverse drive of pulse motor 1001 which is connected to driving pulley 1002 by timing belt 1004, and thus reading block 109 slides in the direction of arrow signs A' or B'. Reading block 109 is sandwiched between exposure glass 108 and rails 1000a and 1000b. Reading block 109 slides on rails 1000a and 1000b under the drive of wire 1003 by means of sliding components 1008a and 1008b, which are mounted on its top, and roller 1010a and 1010b provided on plate springs 1009a and 1009b, which extend from its underside, as shown in FIG. 6. During sliding, the position of reading block 109 is always maintained constant in relation to the surface of exposure glass 108, being sprung back in the direction of arrow sign A by the reaction of plate springs 1009a and 1009b. Incidentally, when reading block 109 passes beyond exposure glass 108 and reaches the position shown by the dotted lines, since, as shown in FIG. 7, block components 1011a and 1011b are provided in ADF unit 13 in the same plate as the underside of exposure glass 108, it can still slide while maintaining a fixed gap, even when it comes under ADF unit 103.

Figure 8A:
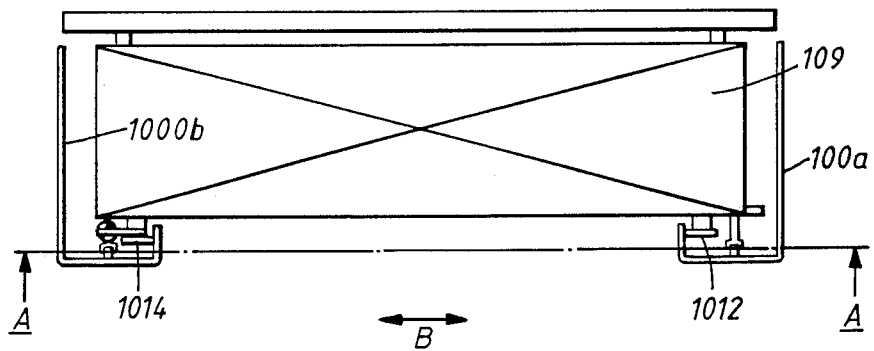
FIG. 8(a) is a side elevation of the document reader unit.
Figure 8B:
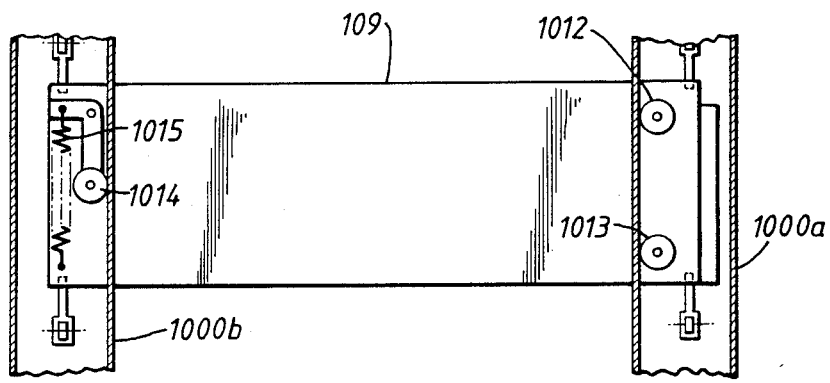
FIG. 8(b) is a cross-section at A—A of the document reader unit in FIG. 8(a).

FIGS. 8a and 8b show the method of determining the position of reading block 109 in the direction of slide and the perpendicular direction (direction B in the drawing). Roller 1012 and roller 1013 are secured on the right-hand underside, and roller 1014, which can take up a variable position is provided on the left-hand underside of reading block 109. Rollers 1012 and 1013 butt against the bent portion of rail 1000a, and by pressing roller 1014 against the bent portion of the other rail 1000b using spring 1015, the position in the B direction is determined.

Figure 9:
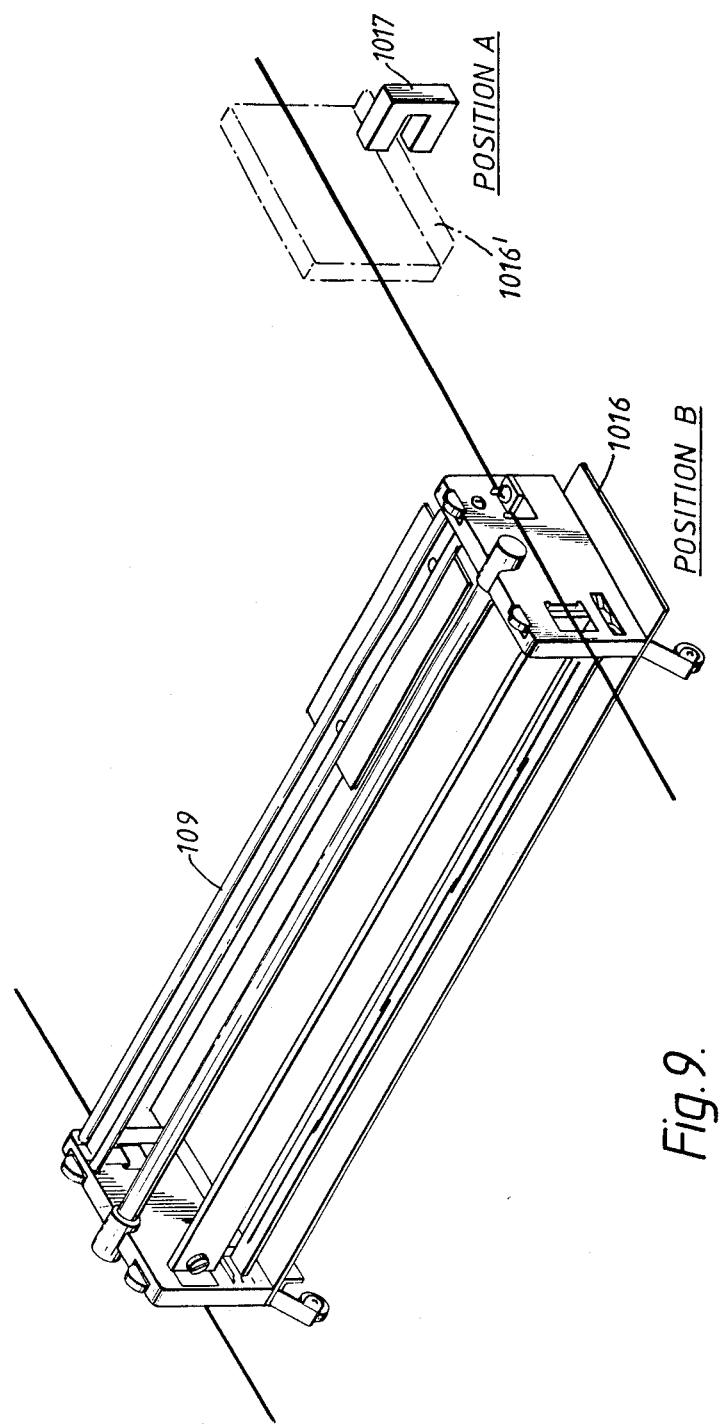
FIG. 9 is an oblique view showing a shifted position of the document reader unit.
Figure 10A:
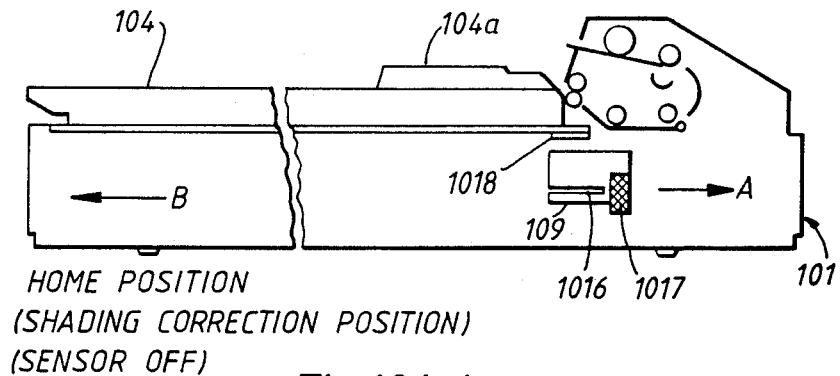
FIGS. 10(a), 10(b) and 10(c) are structural cross-sections illustrating the shift of the document reader unit.
Figure 10B:
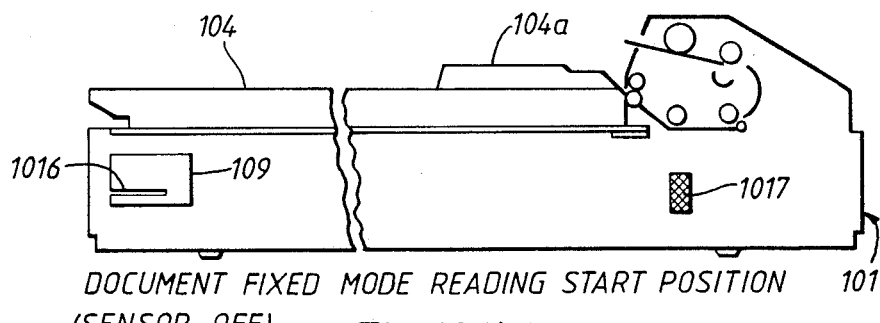
Figure 10C:
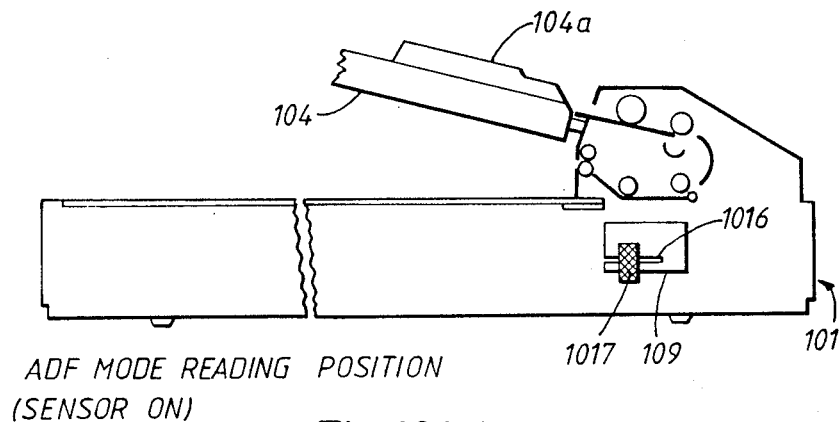

As shown in FIG. 9, a plate 1016 is provided on the side of reading block 109 and a sensor 1017 is mounted on rail 1000 which is not illustrated. The sensor is OFF with plate 1016 in position A, and it is ON when plate 1016 is in position B. The mounting position of sensor 1017 is shown in FIGS. 10(a)–10(c). When reading block 109 is positioned in the extreme left-hand position in the drawings, it is in the reading start position for the Document Fixed Mode. When it is positioned at the right-hand side, it is in the reading position for the ADF Mode. When reading block 109 is positioned to the left of the home position, the output of sensor 1017 is OFF, and when it is to the right, the sensor output is ON. In the case of the output of sensor 1017 being OFF when the power is switched ON, reading block 109 moves in the direction of the arrow sign A in the drawings. When the output of sensor 1017 is ON, reading block 109 shifts in the B direction, and its position when the sensor output is OFF is in the home position. Also, in the case of the output of sensor 1017 being ON when the power is switched ON, reading block 109 shifts in the B direction and the position in which the sensor output is OFF becomes the home position. In the home position, the shading correction plate 1018 carries out shading correction prior to reading. As described above, sensor 1017 is mounted so that, in the case of reading block 109 being to the right of the home position, the sensor output is always ON, and when it is to the left, the sensor output is always OFF. The distance of shift from the home position to the Document Fixed Mode reading start position or to the ADF Mode reading position is controlled by counting the number of pulses of pulse motor 1001 which is not illustrated.

Figure 11A:
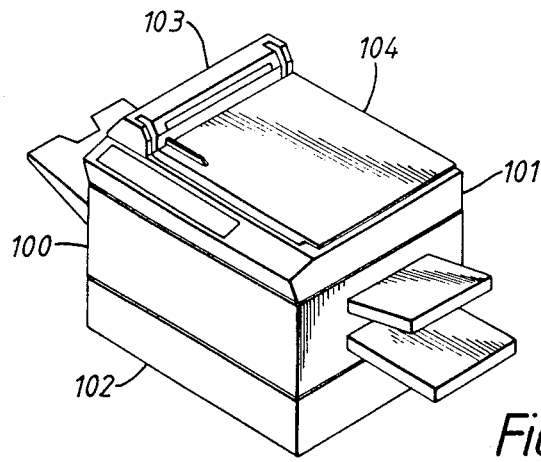
FIGS. 11(a), 11(b) and 11(c) are oblique views showing the stages of the operation of the automatic document feed device.
Figure 11B:
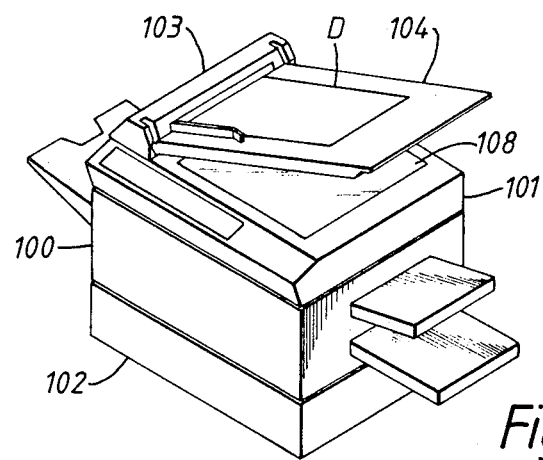
Figure 11C:
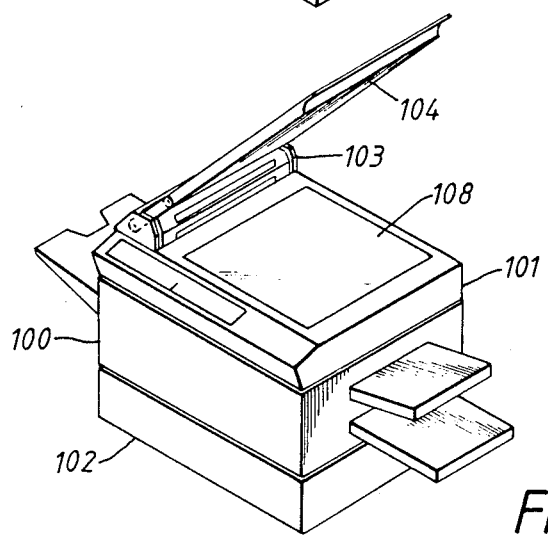
Figure 12:
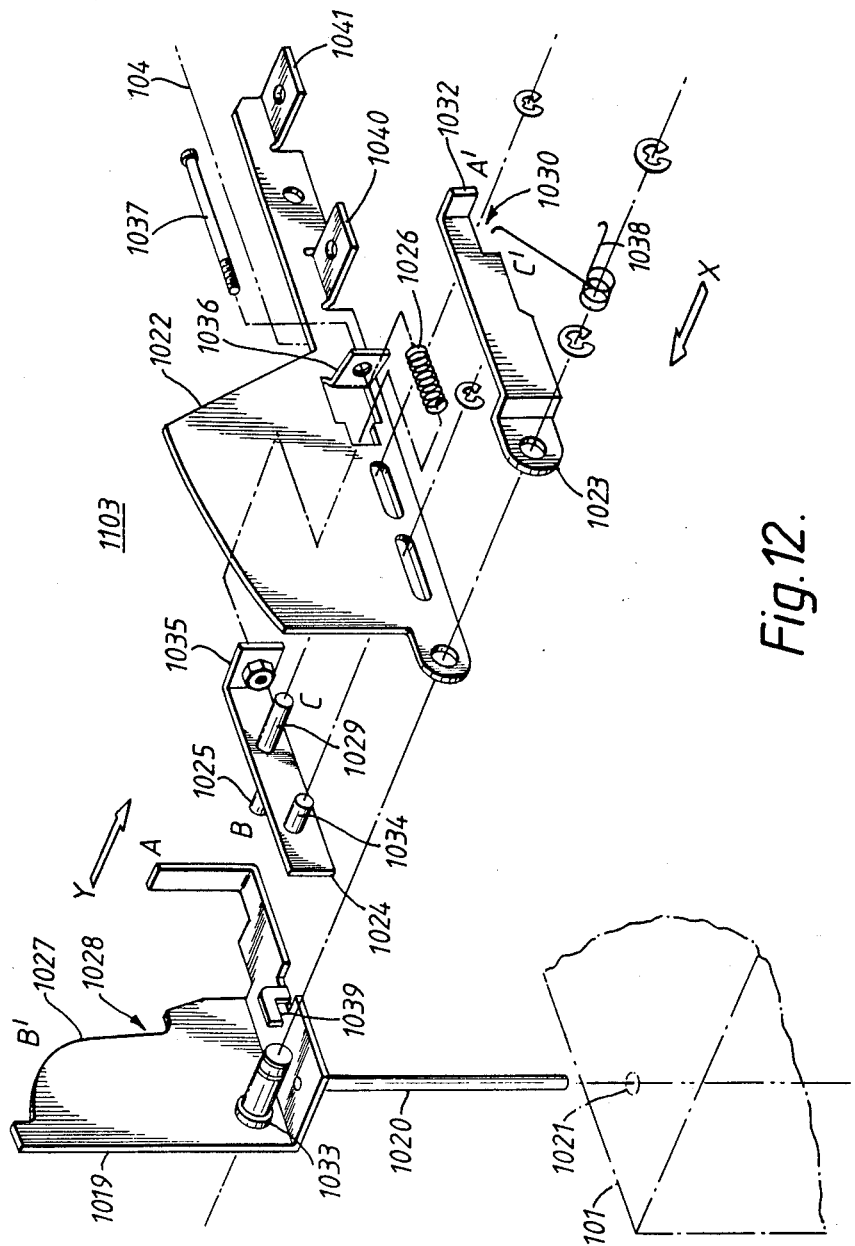
FIG. 12 is an exploded oblique view of the essential parts of the document presser plate position changing and holding unit.

Next, the operation of document presser plate 104 is described. The operation mode of document presser plate 104 differs according to whether it is in the open or closed position. First, there are 3 positions for document presser plate 104. As shown in FIG. 11a, the 1st position of document presser plate 104 is the case of the "Document Fixed Mode" when document presser plate 104 is closed and a document is enclosed underneath it and copied. The 2nd position of document presser plate 104, as shown in FIG. 11b, is the case of the "ADF Mode" in which a document D, placed with the side to be copied uppermost on top of document presser plate 104, is fed along guide 104a when document presser plate 104 is opened to a specified position. The 3rd position, as shown in FIG. 11c, is in the case of the "Document Fixed Mode" when, by opening document presser plate 104 wide for removing a document after copying, the document can easily be removed. Incidentally, the dispensing of documents after copying in the case of the "ADF Mode" is carried out on to exposure glass 108. The document presser plate position changing and holding device 1103 such as hinge mechanism which temporarily secures document presser plate 104 in these positions is shown as an exploded drawing in FIG. 12. This hinge mechanism of the document presser plate position changing and holding device 1103 is mainly composed of bracket 1019, which is secured to scanner unit 101 in such a way that it can be freely removed and replaced, and plate 1022, which is secured to the end of document presser plate 104. Pin 1020 is provided on bracket 1019, and this pin 1020 is for securing such components as document presser plate 104 and automatic feed device 103 do that they can freely be removed or replaced by inserting pin 1020 into hole 1021 provided in the cabinet of scanner unit 101. Plate 1022 is pivoted on stud 1033, provided on bracket 1019, so that it is free to rotate. Sliding plate 1024, which is forced in the direction of stud 1033 by spring 1026, is provided on the side of plate 1022 so that it can slide freely along the 2 slots provided in plate 1022. On the bracket 1019 side of this sliding plate 1024, a pin 1025 is provided so that it always butts on to the edge B' of bracket 1019, thus regulating the position of sliding plate 1024. Also, on the opposite side of sliding plate 1024, 2 pins 1029 and 1034 are provided which engage in the 2 slots provided in plate 1022. Pin 1029 is longer than pin 1034 and projects sufficiently to enable the side C of the pin to butt against the edge C' of the cut-away portion 1030 of arm 1023 which is pivoted on stud 1033 so that it is free to rotate. Spring 1026 is provided so that it can slide between bent portion 1032 of arm 1023 and bent portion 1036 provided on plate 1022, using screwed spindle 1037 as a guide. Arm 1023 is forced downwards by spring 1038 and is designed so that the edge A' of bent portion 1032 and the edge A of bent portion 1031 provided on bracket 1019 only butt against each other when document presser plate 104 is closed. One end of spring 1038 engages on the upper edge of arm 1023 and the other end engages with engaging portion 1039 provided on bracket 1019. Mounting components 1040 and 1041 are formed on plate 1022 to hold document presser plate 104.

Figure 13A:
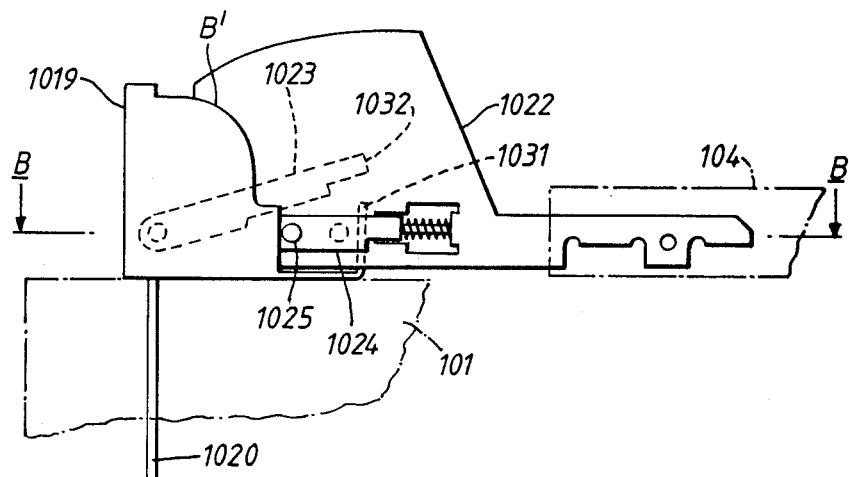
FIG. 13(a) is a side elevation showing only the arm section of the document presser plate position changing and holding unit.
Figure 13B:
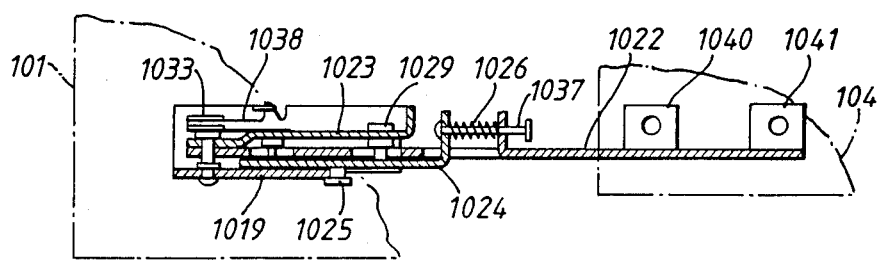
FIG. 13(b) is a cross-section at B—B of FIG. 13(a).
Figure 14:
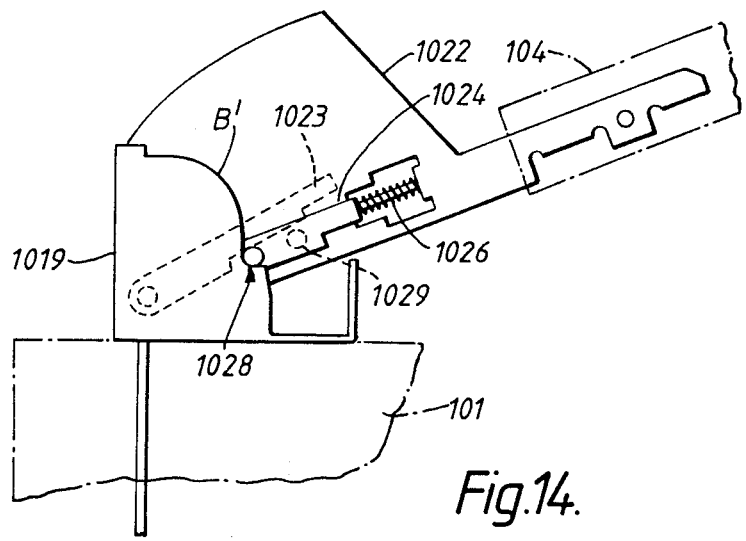
FIG. 14 is a side elevation showing the 2nd operation stage of the arm section of the document presser plate position changing and holding unit.
Figure 15:
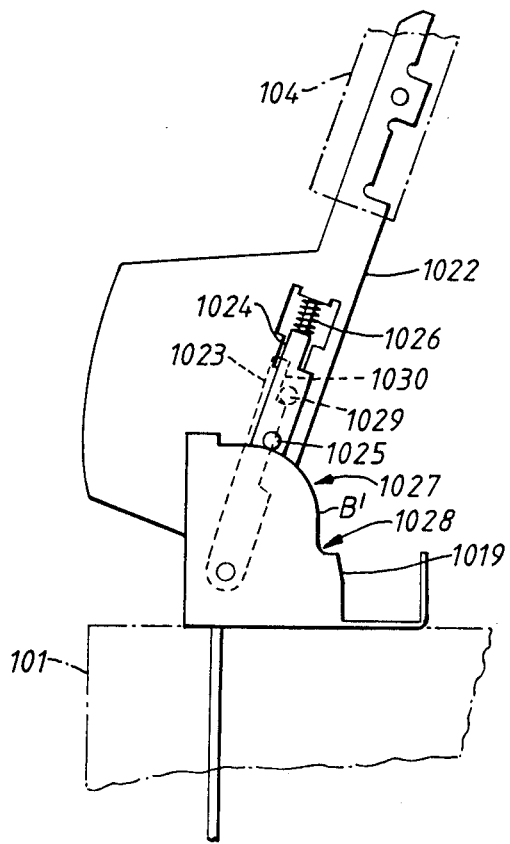
FIG. 15 is a side elevation showing the 3rd operation stage of the arm section of the automatic document feed device.

FIGS. 13a, 14 and 15 show representative positions for the movement of this hinge. Incidentally, these drawings are viewed from the direction of arrow sign Y in FIG. 12. First, when document presser plate 104 is closed as shown in FIG. 13a (incidentally, FIG. 13b shows the cross-section B—B at this time), that is to say, in the "Document Fixed Mode", edge B' of bracket 1019 butts against pin 1025, and it is stabilized in the state in which end A of bent portion 1031 of bracket 1019 (shown by dotted lines) and end A' of bent portion 1032 of arm 1023 (shown by dotted lines), viewed from the direction of arrow sign X in FIG. 12, butt against each other. Next, the case of the "ADF Mode" is shown in FIG. 14. When document presser plate 104 is raised, pin 1025 attached to sliding plate 1024 is pressed against edge B' of bracket 1019 (shown by dotted lines) by spring 1026, and slides along it. Since pin 1025 attached to sliding plate 1024 is always pressed against edge B' of bracket 1019 by spring 1026, when in the "ADF Mode" shown in FIG. 14, pin 1025 drops into step section 1028 provided on bracket 1029, and engages there. In this state, even if an external force is applied to document presser plate 104, it is firmly secured and will not close. In the case of cancelling the "ADF Mode", when document presser plate 104 is raised farther, it slides away from stud 1033 together with sliding plate 1024, since pin 1025 attached to sliding plate 1024 is pressed against edge B' of bracket 1019 (shown by dotted lines) and slides along it. That is to say, when document presser plate 104 is raised to a specified position, pin 1029 slides until it drops into cut-away portion 1031 provided in arm 1023. When document presser plate 104 is fully raised, it is secured so that sliding plate 1024 does not shift towards stud 1033 since pin 1029 engages in cut-away portion 1030 and arm 1023 is forced downwards by spring 1038. That is to say, pin 1029 remains engaged in cut-away portion 1030 until immediately prior to returning to the "Document Fixed Mode" by lowering document presser plate 104. When returning to the "Document Fixed Mode" by lowering document presser plate 104 fully, the engagement of pin 1029 with cut-away portion 1030 is released. Thus, document presser plate 104 returns to the state shown in FIG. 13a and once again sliding plate 1024 and pin 1025 are pressed against edge B' of bracket 1019 by spring 1026.

Figure 16A:
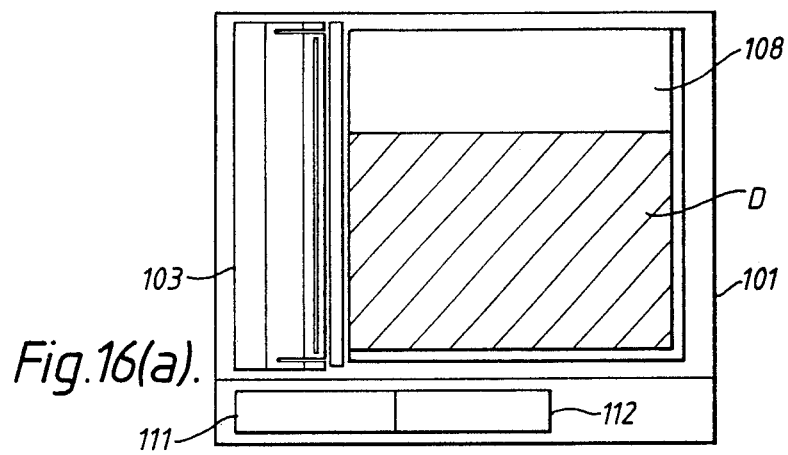
FIGS. 16(a) and 16(b) are plan views of the document reader unit.
Figure 16B:
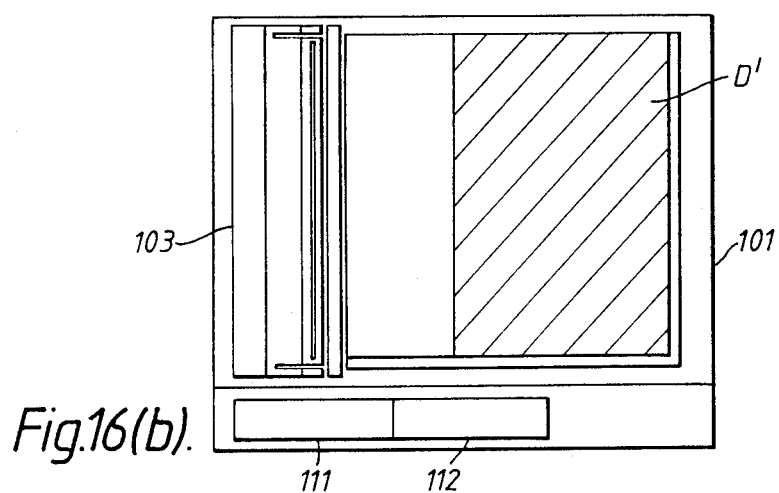

Next, exposure glass 108 in the "Document Fixed Mode" is described. The length and breach of exposure glass 108 are both more than 279 mm. Taking the aspect ratio as 1: 1.09–1: 1.1, it has a size of, for instance, 300 mm × 300 mm. It is constructed so that as A4 document can be placed on it either lengthwise or crosswise, as shown in FIGS. 16a and 16b. Incidentally, document presser plate 104 is omitted in these drawings. When only ordinary copies are required, since it is desirable to have a fast copying rate, the document is placed lengthwise, as shown in FIG. 16b. When it is placed lengthwise, the document is read by scanner 101, and the image signals which have been read are inputted to a personal computer or a document file unit. When they are displayed on a personal computer or the document file unit display which is not illustrated, the image is displayed as a sideways image, so that the displayed image is difficult to see. Therefore, when requiring to display an image of the document, it is placed sideways, as shown in FIG. 16a. By making it possible to arrange the document in either direction in this way, versatile use can be made of the image information obtained from the scanner so that the scope of application of the copier can be extended.

Figure 17:
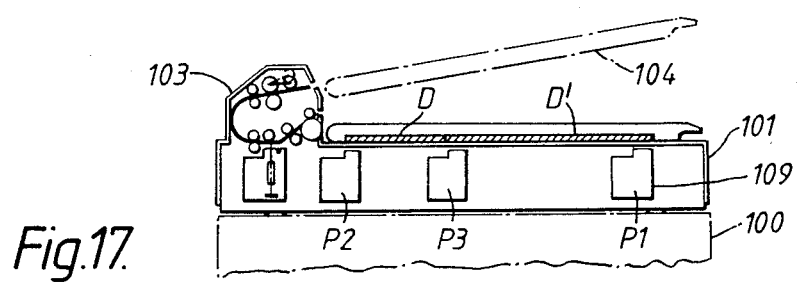
FIG. 17 is a side elevation showing the automatic document feed device and the document reader unit.

When reading a document in the condition shown in FIG. 16a, document reader unit 109 shifts from position P1 to position P2 shown in FIG. 17 and reads the document. In the case of the condition shown in FIG. 16b, document reader unit 109 shifts from position P1 to position P3 and reads the document. In this case, the reading speed is faster because the reading range is shorter.

Next, the document feeding operation in the "ADF Mode" is described.

Figure 18:
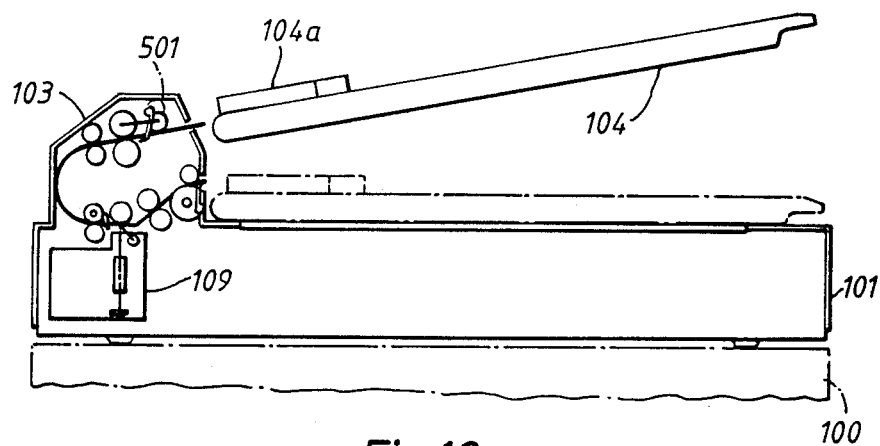
FIG. 18 is a side elevation showing the construction of the automatic document feed device.
Figure 19:
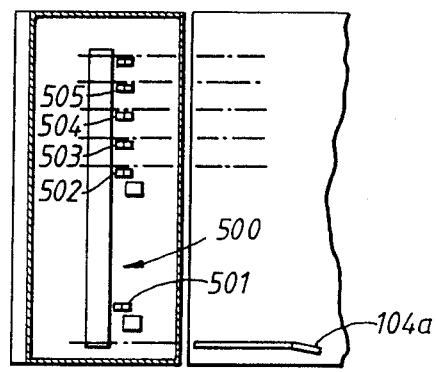
FIG. 19 is a plan view of a partial cross-section showing the construction of the automatic document feed device.

The document size sensor 500 of automatic document feed device 103 is shown in FIGS. 18 and 19. Document size sensor 500 butts against the upper surface of documents which have been loaded, and it has a document sensor switch 501 which operates according to the number of documents. Document sensor switches 502, 503, 504 and 505 are arranged in the same line as document sensor switch 501 in positions which correspond to paper sizes B5, A4, B4 and A3. These documents sensor switches 502–505 are designed to sense the document size automatically.

Figure 20:
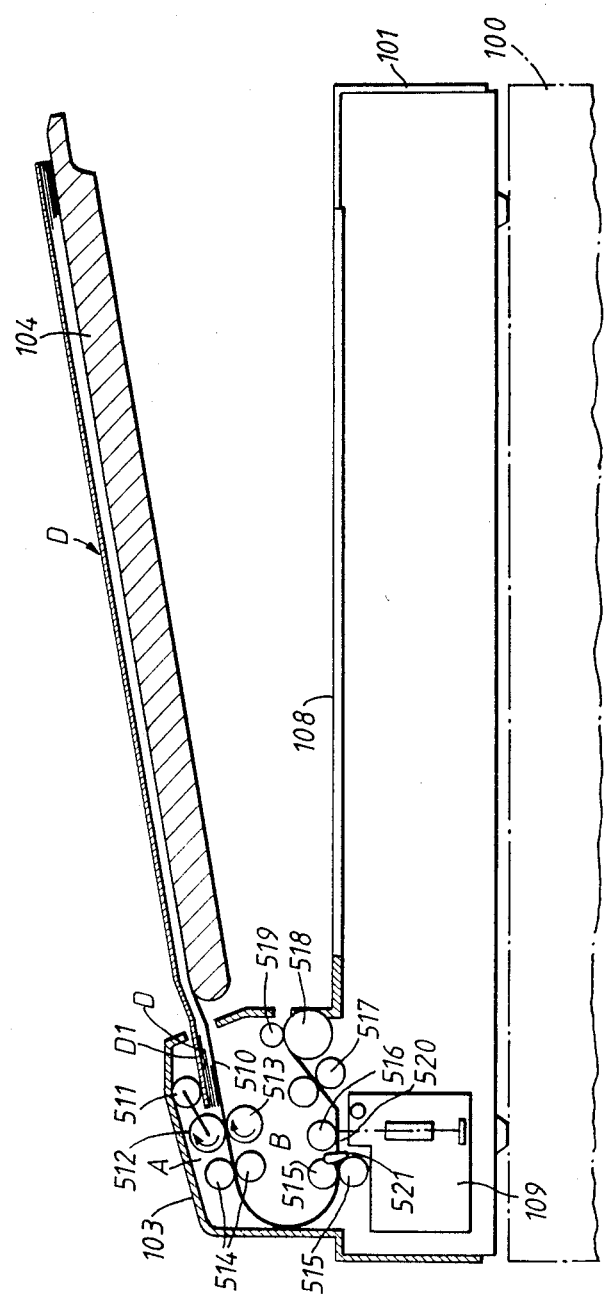
FIG. 20 is a side cross-section showing the construction of the automatic document feed device.

As shown in FIG. 20, documents D loaded on to document cover 104 are inserted between document guide 510 and document extractor roller 511. Document extractor roller 511 butts against the topmost document D1 of loaded documents D and feeds the document by friction.

Separator roller pair 512 and 513 rotate in mutually opposite directions, as shown by arrow signs A and B, and documents which come between rollers 512 and 513 are separated and dispatched sheet by sheet. A document which has passed through separator roller pair 512 and 513 has its transport speed controlled by 2 sets of feed roller pairs 514 and 515. Document sensor switch 521 is provided on the far side of the latter feed roller pair 515. This document sensor switch 521 counts the documents which pass through and, at the same time, performs the function of measuring the lengths of the documents which are passing through.

A document fed from feed roller pair 521 passes under platen roller 516 while being pressed against platen roller 516 by document guide 520 and is read by document reader unit 109 which is described later. After reading, the document is dispensed on to the surface of exposure glass 108 by feed rollers 517 and dispense rollers 518 and 519.

Figure 21:
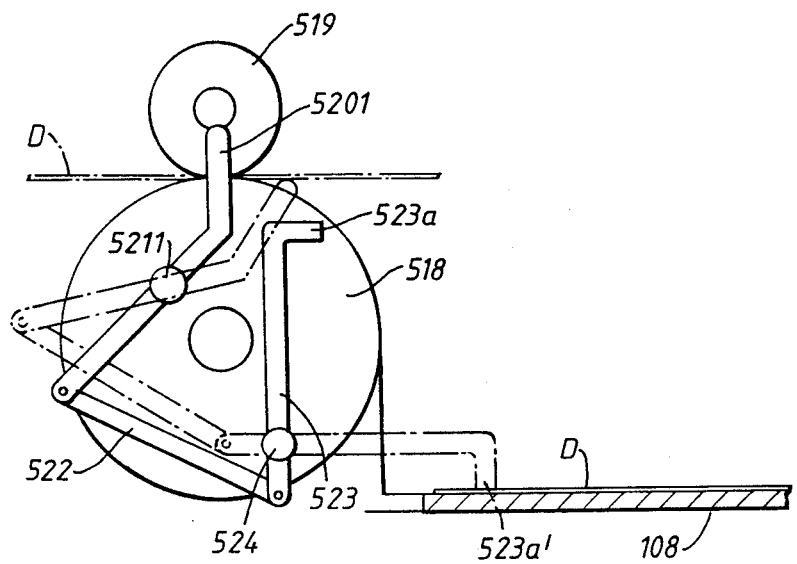
FIG. 21 is a side elevation showing the mechanism of the dispenser unit of the automatic document feed device.

As shown in FIG. 21, a document D, passing between dispense rollers 518 and 519, depresses the tip of link 5201 as shown by the broken line in the drawing. By this means, link 5201 rotates about pin 5211, and the connected links 522 and 523 are shifted as shown by the broken lines. In the shifted position, the tip 523a of link 523 moves close to the surface of exposure glass 108 and presses on the rear end of documents D which have already been dispensed.

This mechanism feeds documents D by friction between the documents which have already been dispensed and the documents which are dispensed later and prevents documents falling off exposure glass 108 using tip 523a of link 523 to press on the rear end of documents D.

When a document has passed between dispense roller pair 518 and 519, links 5201, 522 and 523 return to the position shown by the solid lines and the document which has passed between dispense roller pair 518 and 519 is dispensed on top of the documents which have already been dispensed on to the surface of the exposure glass.

Figure 22:
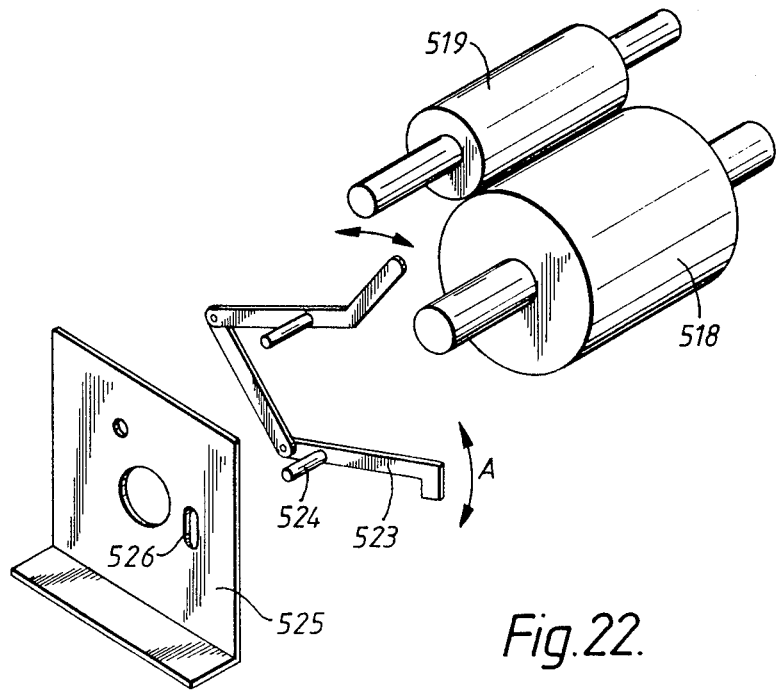
FIG. 22 is an exploded view showing the mechanism of the dispenser unit of the automatic document feed device.
Figure 23:
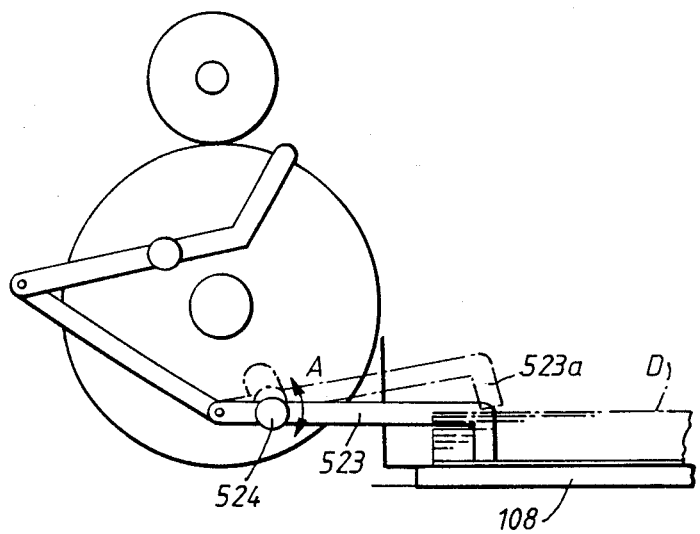
FIG. 23 is a side elevation showing the mechanism of the dispenser unit of the automatic document feed device.

As shown in FIG. 22, a slot 526 is provided in plate 525 to hold pin 524 which is the centre of rotation of link 523 in the direction of arrow sign A, as shown in FIG. 23. Pin 524 is inserted in this slot 526 so that it is free to shift. Since pin 524 is positioned at the fulcrum of link 523 so that it is free to shift in slot 526, link 523 shifts to the position shown by the broken lines in response to the number of documents dispensed and loaded on exposure glass 108. At this time, tip 523a presses on one end of the documents at the position of the height of the loaded documents with the weight 5 g of link 523 itself, thus preventing documents from slipping off.

Figure 24:
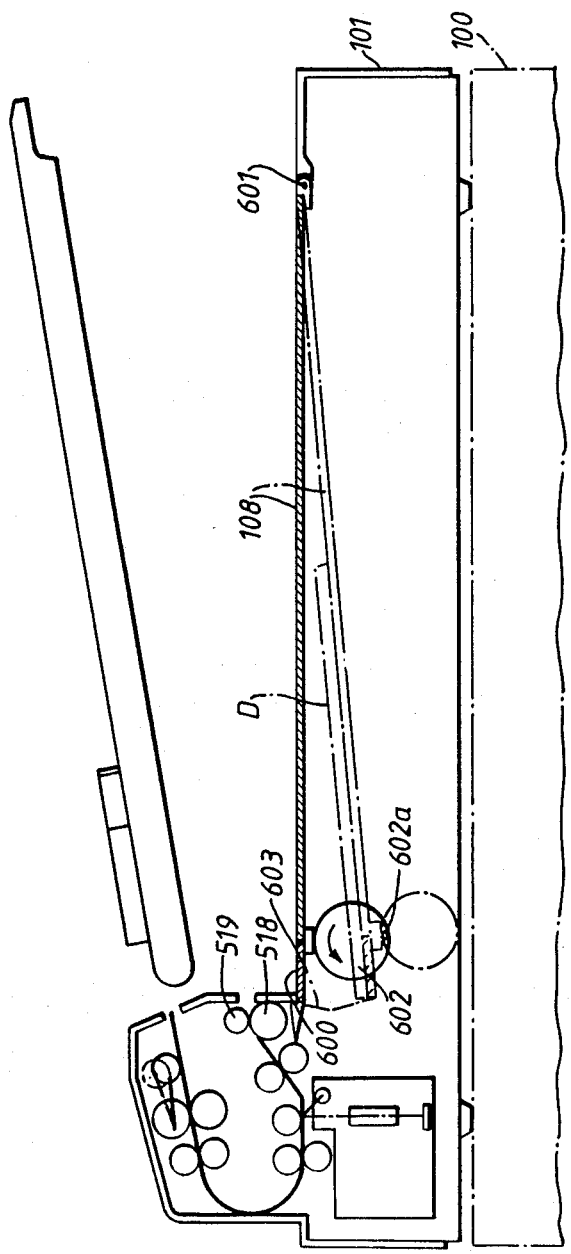
FIGS. 24, 25 and 26 show the automatic document feed device and the exposure glass.

In FIGS. 21 to 23, slippage of documents D is prevented by link 523. However, as shown in FIG. 24, slippage of documents towards the right of the drawing can be prevented by making the surface of exposure glass 108 tilt so that it is lower at the ADF device 103 side. For this mechanism, eccentric cam 602 on rotating spindle 602a is arranged underneath exposure glass 108 and glass support component 600 in the vicinity of ADF device 103. Exposure glass 108 is installed so that it can rotate using pin 601 as a fulcrum. Since eccentric cam 602 is designed so that it will rotate by a link motion when the "ADF Mode" is used, exposure glass 108 and glass support component 600 descend and shift to the position shown by the alternate long and short dash lines. A foldable bellows 603 is attached to glass support component 600, and when exposure glass 108 shifts to the position shown by the alternate long and short dash lines, bellows 603 expands and document D dispensed by dispense roller pair 518 and 519 is received by this bellows 603.

Figure 25:
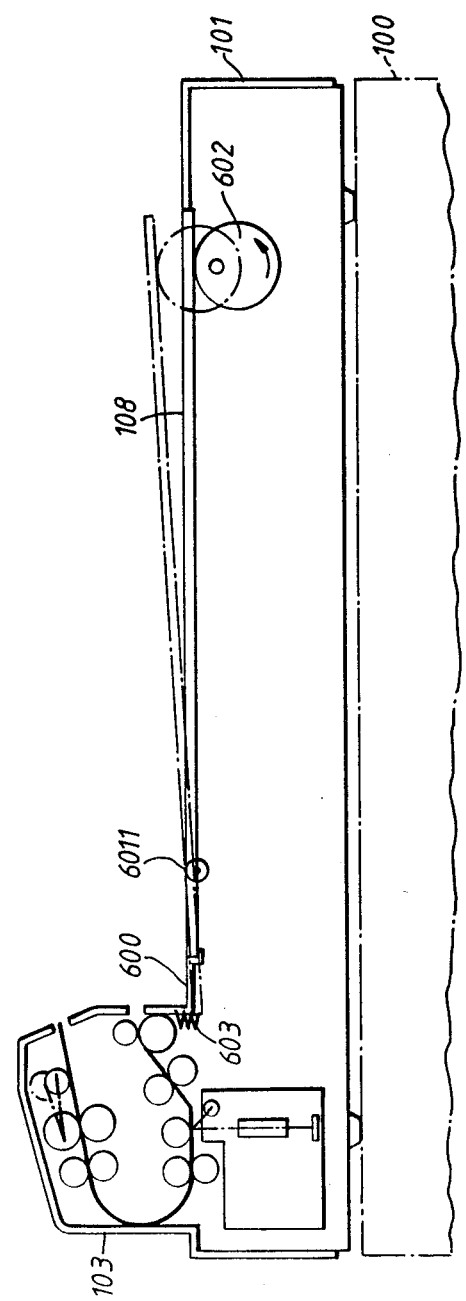

In FIG. 24, pin 601, which is used as a fulcrum, is provided on the side away from ADF device 103, and cam 602 is provided in a position close to ADF device 103. However, in other examples, as shown in FIG. 25, the design may be that pin 6011 is provided as a fulcrum on the side close to ADF device 103, and cam 6021 on rotating spindle 6021a is provided on the side away from ADF device 103. By this method, the rear end of exposure glass 108 is raised by the rotation of cam 6021, using pin 6011 as a fulcrum, and exposure glass 108 is tilted.

Figure 26:
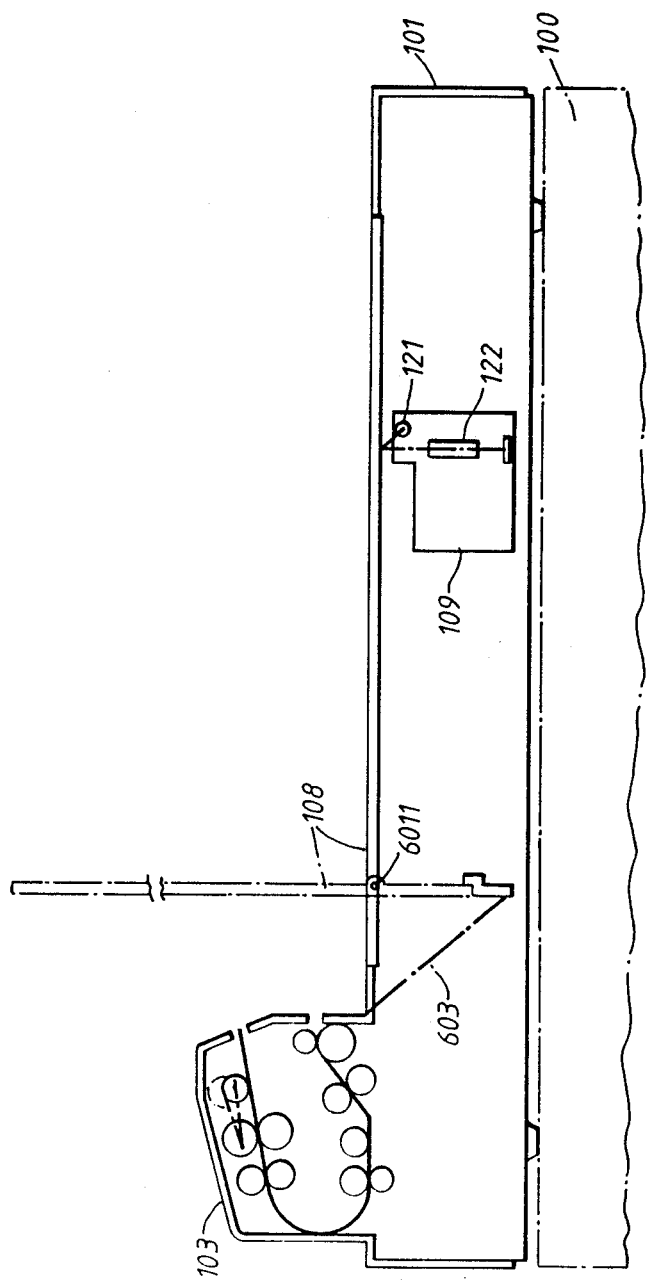

In FIG. 26, document reader unit 109 is exposed by rotating exposure glass 108 fully, as shown by the long and short dash lines. Thus, maintenance and checking of document reader unit 109, that is to say, cleaning of xenon lamp 121 and self-focusing lens 122 and replacement of xenon lamp 121 can easily be carried out. In this case, the power supply switch (not illustrated) is switched OFF.

Document reader unit 109 shown in FIG. 27 is composed of a light source lamp for exposure, that is to say, xenon lamp 121, inverter 123, self-focusing lens (angular aperture 9°, conjugate length 48 mm) 122, contact CCD sensor 124 and photoelectric converter unit 125. The output unit of document reader unit 109 is connected to binary conversion control unit 127 via flat cable 126. A document image is formed in contact CCD sensor 124 through self-focusing lens 122 by the exposure of document D, using light from exposure light source 121.

In the operating panel 111 shown in FIG. 28, a start key 150, for starting the copying operation, and a 10-key 151, for inputting the number of copies, are provided. A display 152 which shows the number of copies is provided above 10-key 151. A cancel key 153 provided adjacent to start key 150 is operated to cancel the number of copies which has been inputted. A cassette selector key 154 is provided for the selection of upper cassette 105 or lower cassette 106. An LCD display 156 is provided for displaying the various states of the copier. For instance, such states as waiting, paper size formation, jamming and toner supply are displayed in pattern form.

Thus, for switching from the Document Fixed Mode to the ADF Mode, document presser cover 104 is set in the position shown in FIG. 11b and is used as the ADF paper feed tray. When document D is placed on document presser cover 104 and inserted into ADF unit 103, document sensor switch 501 of document size sensor 500 switches ON. When start key 150 of operating panel 111 is pressed in this state, the ADF Mode is sensed and reader block 109 shifts to the ADF reading position after shading correction, and reading commences.

In the case of the document sensor switch being OFF, the Document Fixed Mode is sensed and, after start key 150 is pressed and shading correction has been carried out, reader block 109 shifts to the Document Fixed reading start position and then scanning commences.

Auto-magnification mode selector key 157 is provided for specifying the mode in which a document image is automatically reduced or enlarged according to the sizes of the document image and the paper. Magnification setting key 158 is provided for setting the mode in which an image is reduced or enlarged according to desired numerical values inputted by 10-key 151. Mode selector key 159 is provided for setting the mode which performs enlargement or reduction according to the correlation between the document size and the paper size.

Figure 29A:
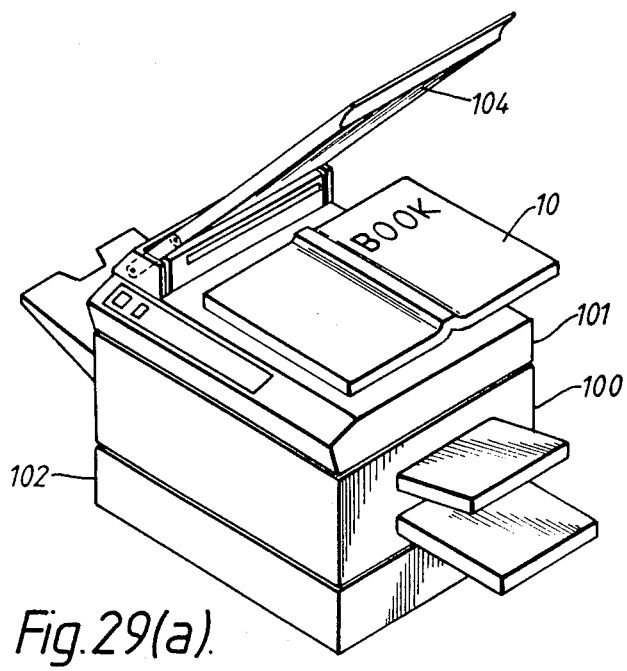
FIGS. 29(a) and 29(b) are oblique views of the electronic copying machine when copying a block.
Figure 29B:
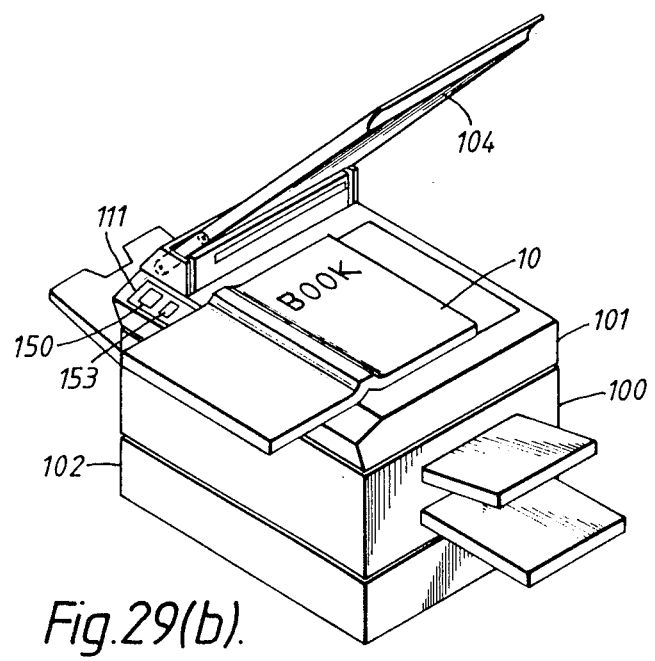

By using operating panel 111 shown in FIG. 28, operating the copier for copying a book is convenient. This is because, for copying the left side of book 10, as shown in FIG. 29a, book 10 can be placed on exposure glass 108 so that it does not cover operating panel 111 and thus does not affect the operation of the panel. However, when copying the right side of book 10, the left side of the book covers operating panel 111 and will therfore make operation difficult. However, since start key 150 and clear key 153 and also 10-key 151 and sheet number display 152 are arranged at either end of operating panel 111 clear of the document scanning area, as shown in FIG. 29b, there is no difficulty in the essential operations of the copier and the copying operation can be smoothly performed.

Figure 30:
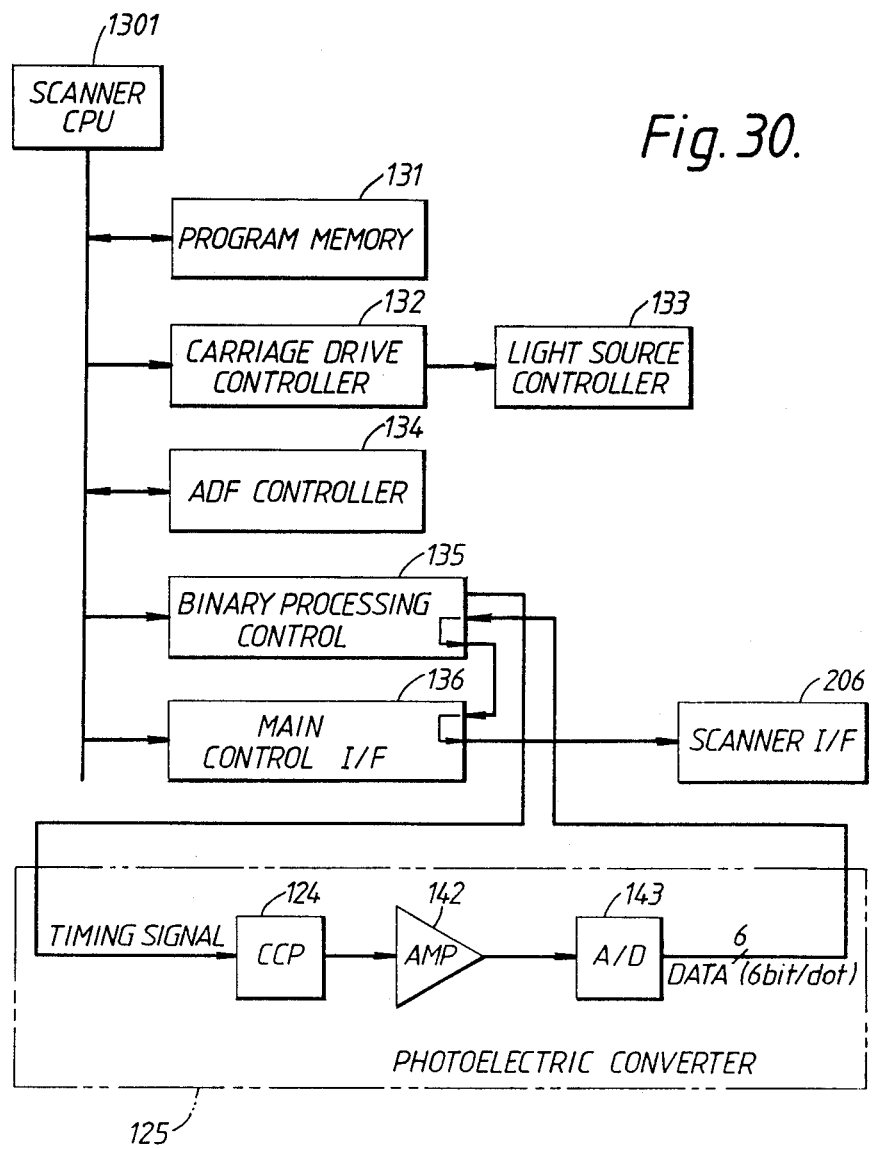
FIG. 30 is a block circuit diagram of the scanner unit.

Next, the construction of scanner unit 109 is described with reference to FIG. 30. Scanner CPU 1301 is a CPU for overall control of scanner 109. This CPU 1301 is connected to program memory 131, carriage drive control unit 132, ADF control unit 134, binary processing control unit 135 and main control unit 136 via a bus-line.

Program memory 131 stores the program for the execution sequence of scanner unit 109. Carriage control unit 132 drives the carriage by controlling the linear stepping motor, etc. The speed of the carriage can be varied according to commands from control unit 102 specifying enlargement or reduction modes. By varying the transfer speed of the carriage, the density in the document feed direction (secondary scanning direction) can be varied. By this means, enlargement or reduction of the image can be carried out.

Photoelectric control unit 133 switches on the xenon lamp of exposure light source 121 during document reading. ADF control unit 134 drives ADF device 103. Document size information if transmitted to control unit 102 in respone to the operation of document width sensing switches 502–505 and document sensor switch 501. Control unit 102 determines the document reading area according to the document size information.

When document sensor switch 501 senses that there is no document, control unit 102 generates a command for the operation of scanner 109 to stop in response this sensing signal from switch 501. Binary processing controller 135 outputs to photoelectric converter 125 the timing signal required for reading data, and also carries out binary processing of the 6 bit/dot digital data outputted from photoelectric converter 125. The image data obtained by binary processing is inputted to scanner interface 206 via main control interface 136. The image data is transmitted to the CPU bus (FIG. 2) via scanner interface 206.

Photoelectric converter 125 is composed of CCD 124, amplifier 142 which amplifies the output of CCD 124 and A/D converter 143. When document D is irradiated by light source 121 shown in FIG. 27 and the reflected light from the document is incident on CCD 124, CCD 124 outputs an image signal corresponding to the image of document D. This image signal is amplified by amplifier 142 and is converted to, for instance, 6 bit/dot digital image data by A/D converter 143.

In photoelectric converter 125, while the density in the secondary scanning direction is variable according to whether in the enlargement mode or the reduction mode, the density in the main scanning direction (equivalent to the width direction of the document) is constant (e.g. 16 lines/mm).

Figure 31:
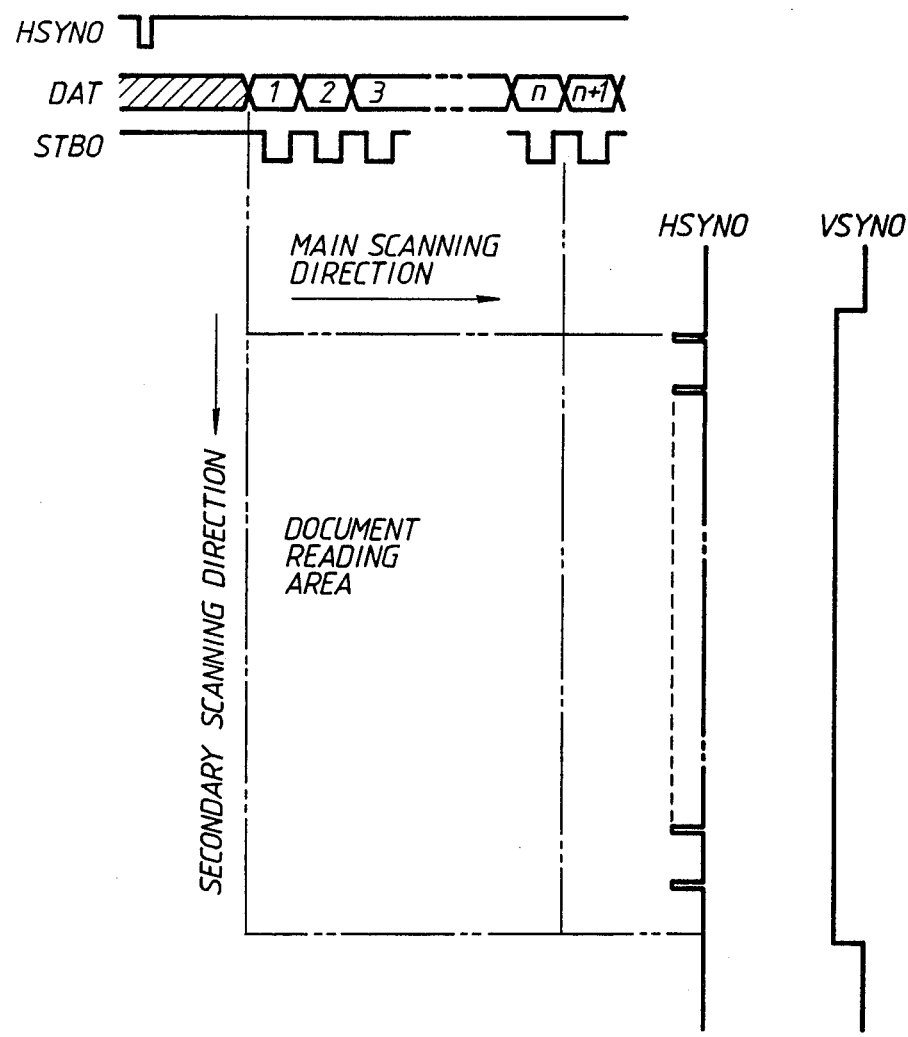
FIG. 31 is a timing chart of the scanning operation by the scanner.

FIG. 31 shows a timing chart for the document reading operation of scanner unit 109. "HSYNO" is the synchronising signal for each line in the secondary scanning direction and "DAT" indicates data. In the reading mode, binarised data is outputted, for instance, in 8-bit units via an 8 line data-bus.

"STBO" is the "DAT" strobe signal, and "VSYNO" indicates that the secondary scanning direction is in the document reading zone.

Returning to FIG. 3, the construction of LBP unit 100 is described. Photosensitive body 301 is installed approximately in the centre of the envelope of the LBP unit. Around this photosensitive body 301, charger 302, developer 303, discharging lamp 306, copying charger 307, peeling charger 308 and cleaning device 309 are arranged in succession in the direction of rotation shown by the arrow sign.

Laser scanner 310 irradiates photosensitive body 301 with laser beam a modulated in accordance with the image data obtained from photoelectric converter 125. Laser beam a output from this laser scanner 310, which is a device for forming an image of document D on photosensitive body 301, is reflected by 1st reflecting mirror 311 and exposes photosensitive body 310 in the exposure section between charger 302 and developer 303 from directly above photosensitive body 301.

Laser scanner 310 includes a laser diode and a collimator lens for covering the laser beam output from the laser diode into a parallel beam which are not illustrated in the drawing. The parallel laser beam is scanned by polygon mirror 319 and the scan laser beam irradiates mirror 311 via f·$\theta$ lens 320.

Figure 32A:
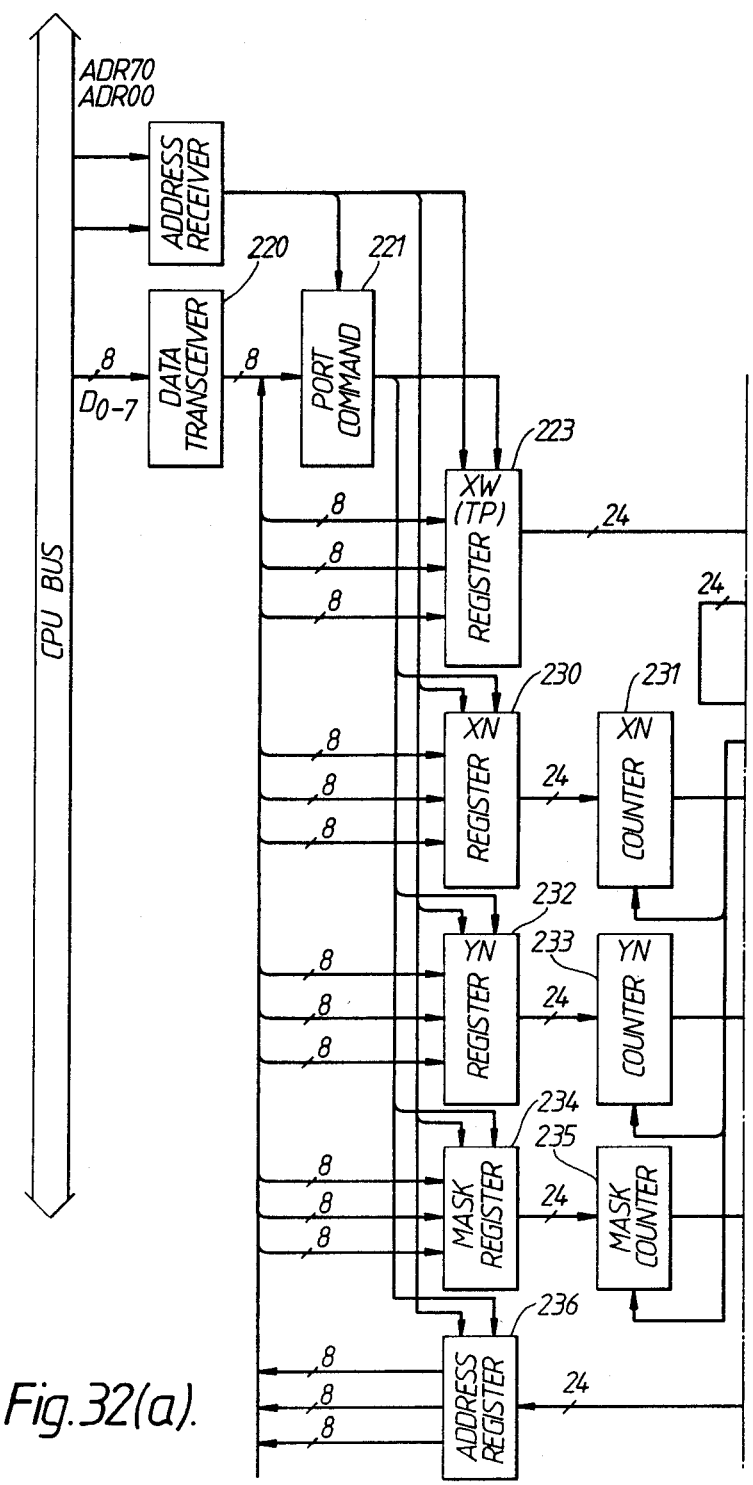
FIG. 32 is a block circuit diagram of the image address controller.
Figure 32B:
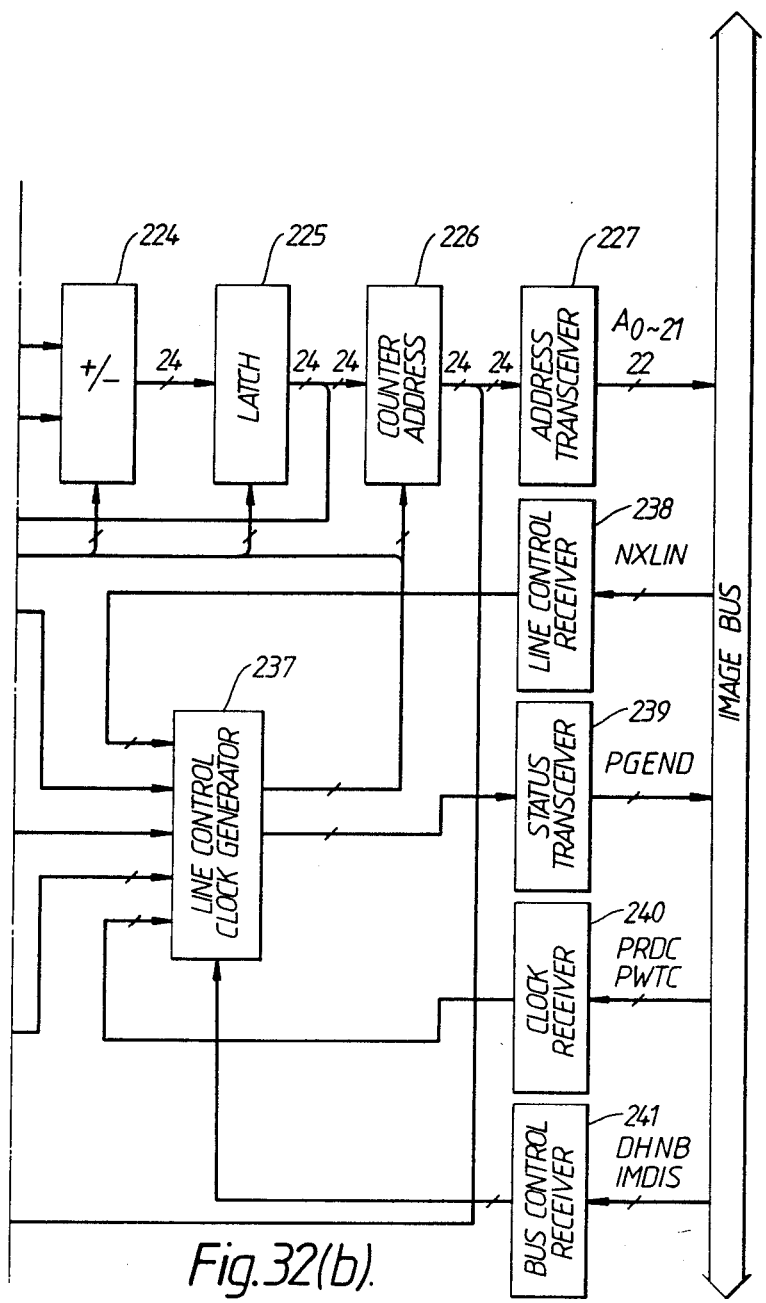
Figure 33:
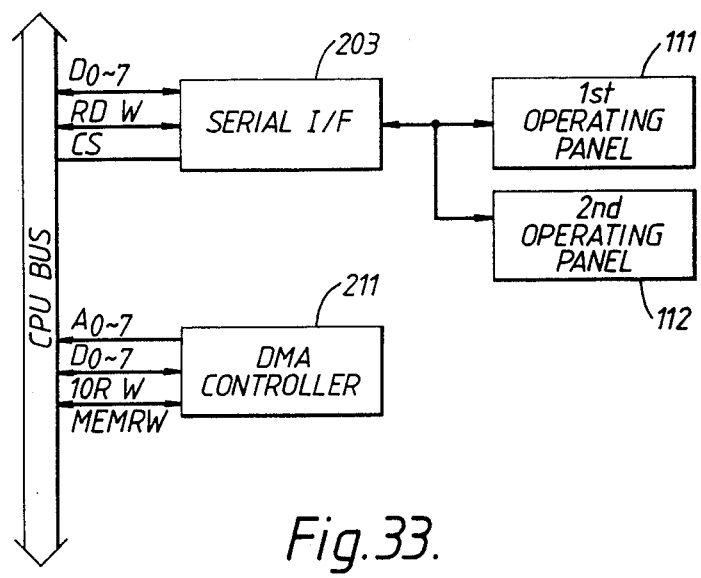
FIG. 33 is a partial block circuit diagram of the controller unit.

Page memory address controller 205, shown in FIG. 2, is described with reference to FIG. 32. This memory address controller 205 controls the address and read signal/write signal of page memory 202.

First, the address controller for page memory 202 is described. Usually, the address of page memory 202 is determined by applying the write signal/read signal as the count for the main scanning direction and the horizontal synchronising signal (HSYNC) as the count for the secondary scanning direction. As round figures for the main and secondary scanning directions in the page memory when specifying the addresses of the page memory by this type of control, there is a multiplication factor of 2, i.e. 1024, 2048, 4096, 8192, . . . However, the actual number for the main scanning direction is not often close to these figures, and in the case of this embodiment also the main scanning width is approximately 5000 bits (approximately 625 bytes) and the secondary scanning width is approximately 7000 bits (approximately 875 bytes). Therefore, in order to satisfy this address space, it is necessary to have an address space of 8192×8192 (1024 bytes×1024 bytes) and the memory element and the counter element are both wasted. In this embodiment, in order to minimise this kind of waste, an address control block is provided, composed of XW(TP) register 223, adder-subtractor 224, latch circuit 225, address counter 226 and address transceiver 227. XW is a value equivalent to the width (in the main scanning direction) of the output paper. XW is determined by CPU 201 (FIG. 2) based on the output of the upper and lower cassette size sensor switches and is set in XW(TP) register 223 via the CPU bus, data transceiver 220 and command port 221. Also, prior to this, the read/write start address (TP) is set in XW(TP) register 223 and is latched in latch circuit 225 through adder-subtractor 224. Since the initial value of the latch is cleared to 0, the first addition result of adder-subtractor 224 will be the same value as the output of the XW register. By this means, TP can be set in latch circuit 225.

When XW is set in XW(TP) register 223 after setting TP in latch circuit 225, the next output of adder-subtractor 224 is TP+XW. The latch operation for this addition result is performed in response to the HSYNC signal (horizontal synchronisation signal) outputted by scanner 310 of laser printer 113, that is to say the NXLIN signal of the image bus. As a result, TP+XW×N is loaded as the initial value in the address counter, and the main scanning direction start address is accessed. Incidentally, the adder-subtractor is normally set to addition. Also, the read signal (PRDC) or the write signal (PWTC) from the image bus is inputted to line control/clock generator 237 via clock receiver 240. Then a write/read clock is generated in synchronization with the read signal or write signal, and the main scanning direction address is successively renewed by this clock. By designating the address in this way, the address becomes a continuous one-dimension number with hardly any spaces, and the minimum number is sufficient for both the memory element and the counter element.

Next, the block which controls the partial reading or the partial writing of the page memory data is described. XN register 230, XN counter 231, YN register 232 and YN counter 233 are provided for this purpose. XN and YN are respectively the main scanning direction and secondary scanning direction values which designate the area of the image memory. These values are set in XN register 230 and YN register 232 via command port 221 by the control of CPU 201. These XN and YN values are respectively set in XN counter 231 which counts the read/write signal and YN counter 233 which counts the HSYNC signal. When the read/write clock has been XN counted, XN counter 231 outputs a carry signal and generates a false HSYNC signal. By this false HSYNC signal, the YN counter counts up. When carry signals are outputted from both XN and YN counters 231 and 233, the whole of the access range designation is completed. At this time, a page-end signal (PGEND) is outputted to the image bus by status transceiver 239 based on the output of line control/clock generator 237. When completion of the access range has been transmitted to each unit, the access range data is all cleared. At this time, the image bus data is all cleared.

In the above embodiment, not only are the specified data in the page memory cancelled, but the writing of specified data is also possible. In this case, after setting TP, XN and YN which designate the data writing position in the same way as before, the data address at which the data to be written is stored and the data length are programmed for DMA (direct memory access) controller 211, and these days are written to page memory 205a by enabling DMA operation. Incidentally, the data to be written are stored in program memory 204. As the data in this case, specified patterns other than characters and symbols may be used, and, in practice, page notations and document outlines may be taken into consideration.

Mask register 234 and mask counter 235 are used when cancelling the image data in a given area of the image memory, and when an address corresponding to a specified area is set in mask register 234, the data in that area are forcibly made zero.

Address register 236 is provided to make the address currently being accessed by the page memory address controller recognisable by CPU 201. This address is transmitted to CPU 201 via data transceiver 220 and the CPU bus.

Line control receiver 238 inputs the line synchronising signal (NXLIN), and bus control receiver 241 inputs the data high enable signal (DHENB) and the image disable signal (IMDIS). All these are transmitted to line control/clock generator 237.

Figure 34:
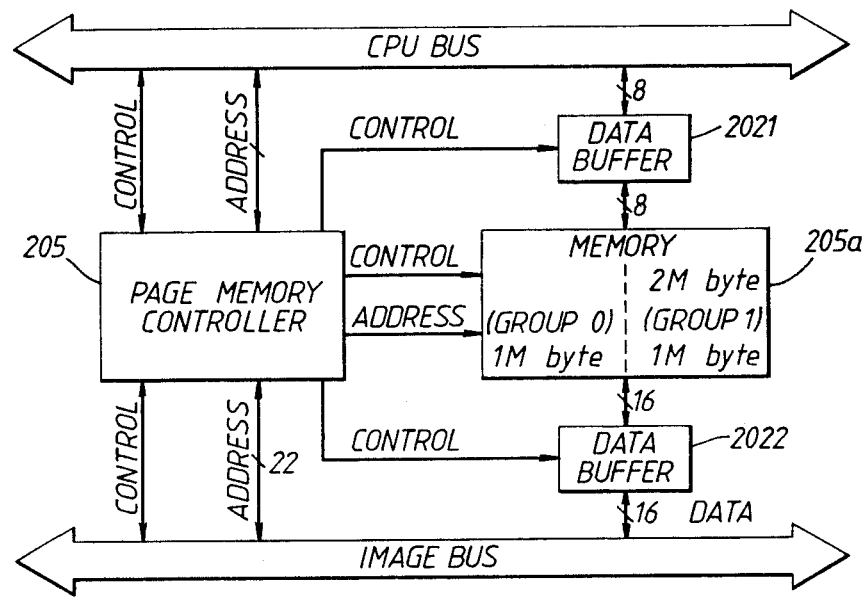
FIG. 34 is a block circuit diagram of the page memory unit.

Next, page memory 205a is described. As shown in FIG. 34, page memory 205a can store 2M-byte of data according to the address signals which are outputted from page memory address controller 205. As memory elements 64 256K-bit dynamic RAMs are used and it has 2M-bytes of memory space. The bus normally used is the image bus, and image data are read from and written to the image bus via data buffer 2021 controlled by the various control signals of page memory address controller 205 and the print control signals. Only in the DMA mode (the mode in which page notations or document outlines are written) is data written from the CPU bus via data buffer 2022.

Figure 35:
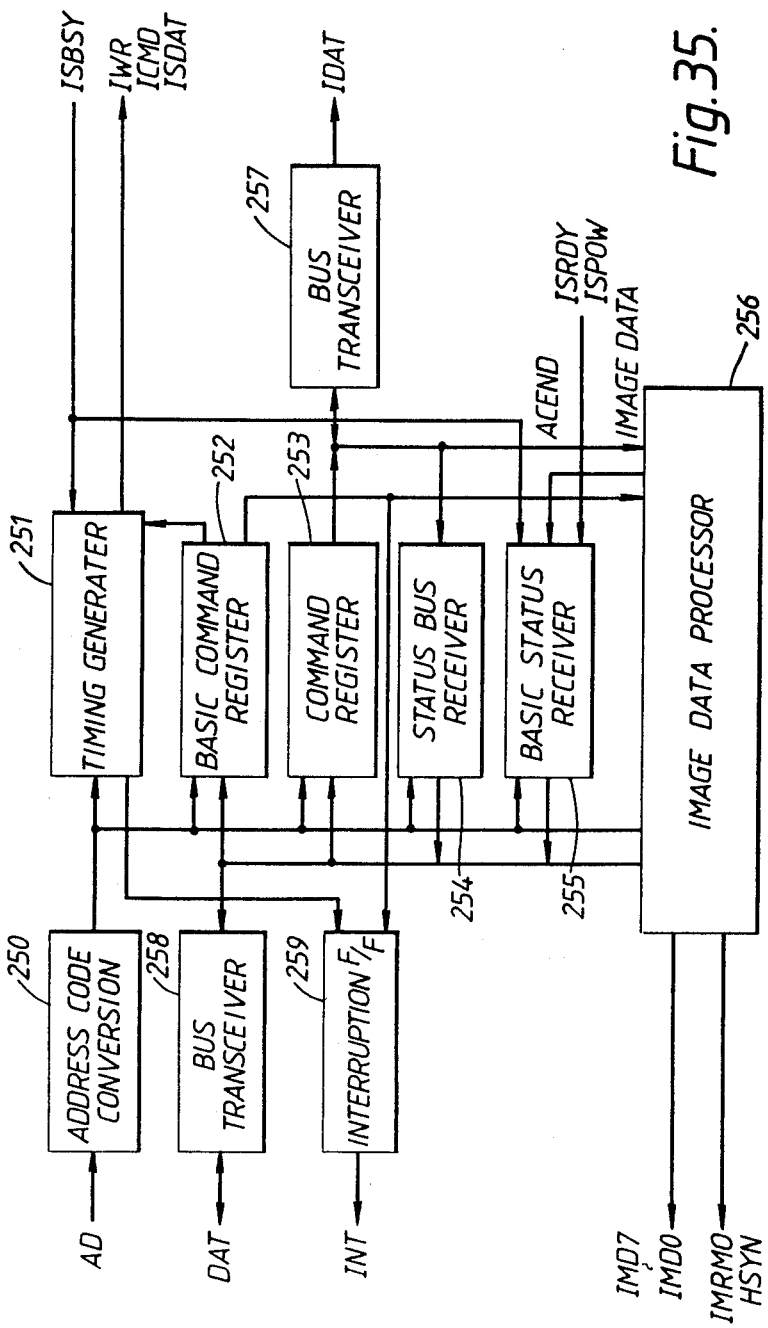
FIGS. 35 and 36 are block circuit diagram of the scanner interfaces.

Next, scanner interface 206 is described with reference to FIGS. 35 to 37. Scanner interface 206 transmits control signals from CPU 201 to scanner unit 101 and, at the same time, transmits the status of scanner unit 101 to CPU 201. Also, the image data which have been read are reduced or enlarged and transmitted to page memory 205a. That is to say, as shown in FIG. 35, the address signal from the CPU bus is inputted to address code converter 250, and the data are inputted to bus transceiver 258. According to the address, various data are written either to basic command register 252 or to command register 253. Also, status data for scanner unit 101 which have been written either by status receiver 254 of basic status receiver 255 are read to CPU 201 via bus transceiver 258 and the CPU bus. Thus, the data (IDAT) inputted/outputted via bus transceiver 257 during renewal of the interface between scanner interface 206 and scanner unit 101 have a bus construction. 3 statuses are displayed by the status of the 2 signals, status signal (ISDAT) and command signal (ICND), transmitted to scanner unit 101 from timing generator 251. That is to say, there are the three statuses of the status data of scanner unit 101, the command data to scanner unit 101, and the image data read by scanner unit 101. Also, the timings of sending and receiving these various data are controlled by the busy signal (ISBSY) outputted from scanner 101 and the write signal (IWR) outputted by timing generator 251. Incidentally, interruption F/F 259 outputs an interruption signal (INTO) to CPU 201.

Figure 36:
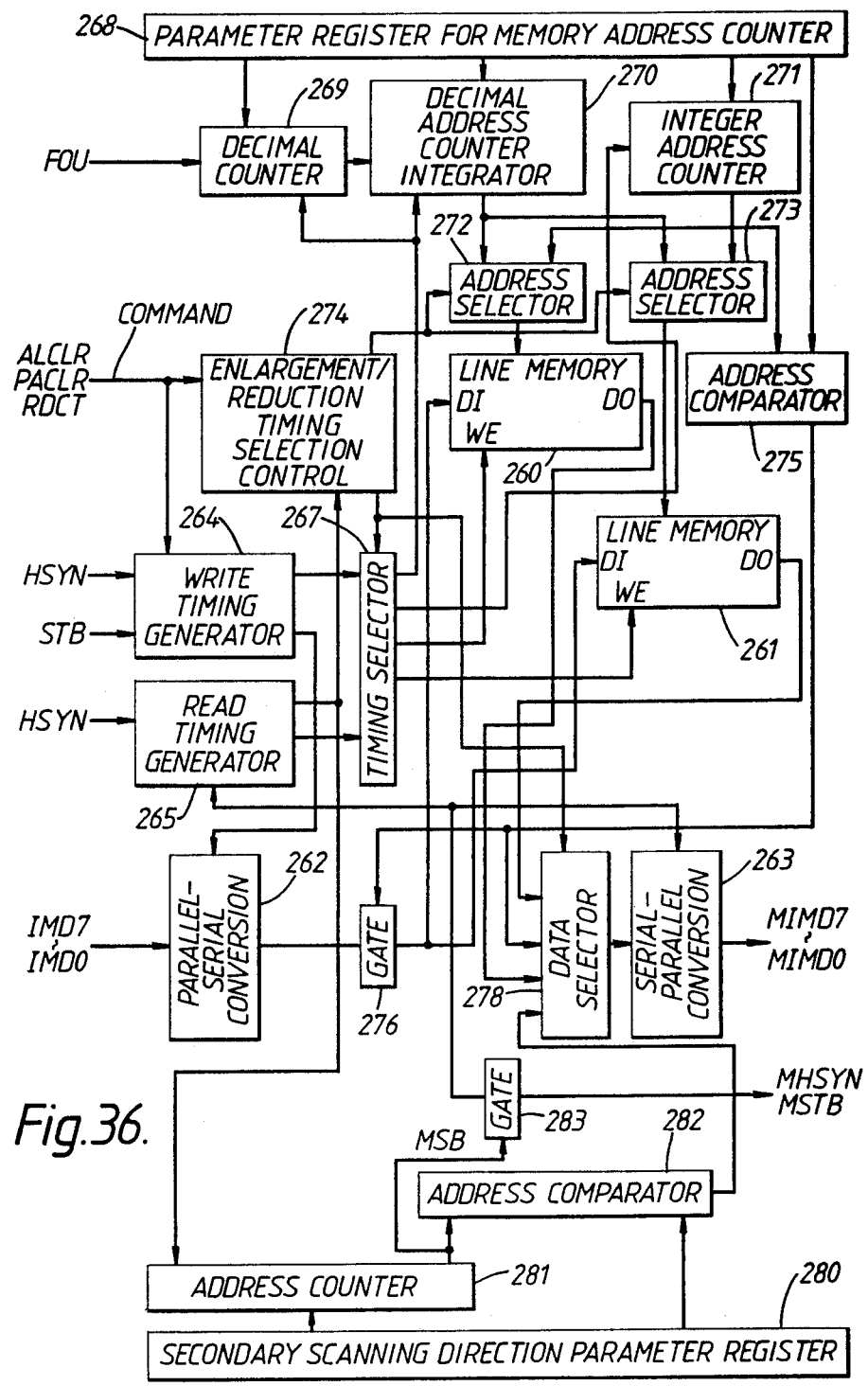

Image processor 256 shown in FIG. 36 has 2 line memories 260 and 261. Enlargement and reduction of the image carried out by alternately reading from and writing to these 2 line memories 260 and 261. Since the image data must be read from and written to line memories 260 and 261 as serial data, the image data, which is inputted in parallel, is converted to serial by parallel-serial converter (hereafter referred to as P-S converter) 262. Also the image data read from line memories 260 and 261 is converted to parallel by serial-parallel converter (hereafter referred to as S-P converter) 263 and outputted to the image bus.

Various blocks are provided which output the timing signals for setting the address signal for reading from and writing to line memories 260 and 261, the read/write timing signal, and the conversion timing for P-S converter 262 and S-P converter 263. Write timing generator circuit 265 outputs 2 types of clock, which are the 8 clocks corresponding to the 8-bit image data and the clocks which delay these, every time a strobe (STB) signal is inputted. These clocks are taken as the timing signals for P-S converter 262 and S-P converter 263. Also, these clocks are used as write/read timing signals via timing selector 267. Furthermore, they are used for generating address signals.

Line memory address counter parameter register 268, decimal counter 269, decimal address counter integrator 270, integer address counter 271 and 2 address selectors 272 and 273 are provided as blocks for generating address signals. Line memory address counter parameter register 268 sets the enlargement or reduction factor to be counted for decimal counter 268 and sets the initial values for decimal address counter integrator 270 and integer address counter 271. Decimal counter 269 adds the enlargement and reduction factors every clock and outputs a carry signal of the sum of the decimal parts. For example, in the case of 0.7 times, carry signals are outputted up to the 3rd clock, but no carry signal is outputted at the 4th clock. ($0.7 \times 3 = 2.1$, 0, $0.7 \times 4 = 2.8$ and no decimal part is carried). Decimal address counter integrator 270 only advances the count when decimal counter 269 generates a carry signal. Integer address counter 271 advances the count every clock.

When reducing data, the output of decimal address counter integrator 270 is used as a write address. By writing data to line memory 260 or 261, writing in which 1 piece of data will be dropped every several pieces of data is carried out. The read address is generated by integer address counter 271, and reduced data and generated.

When enlarging data, data are written to line memories 260 and 261 as they stand by integer address counter 271. The read address is determined by decimal address counter integrator 270. By this means, the same 1 piece of data is read in succession every several pieces, and enlarged data are produced. In this case, address selectors 272 and 273 are provided which output address signals selectively to line memories 260 and 261 by receiving each of the outputs of decimal address counter integrator 270 and integer address counter 271. Incidentally, this address selection by address selectors 272 and 273 is carried out based on the output of enlargement and reduction timing controller 274.

Figure 37A:
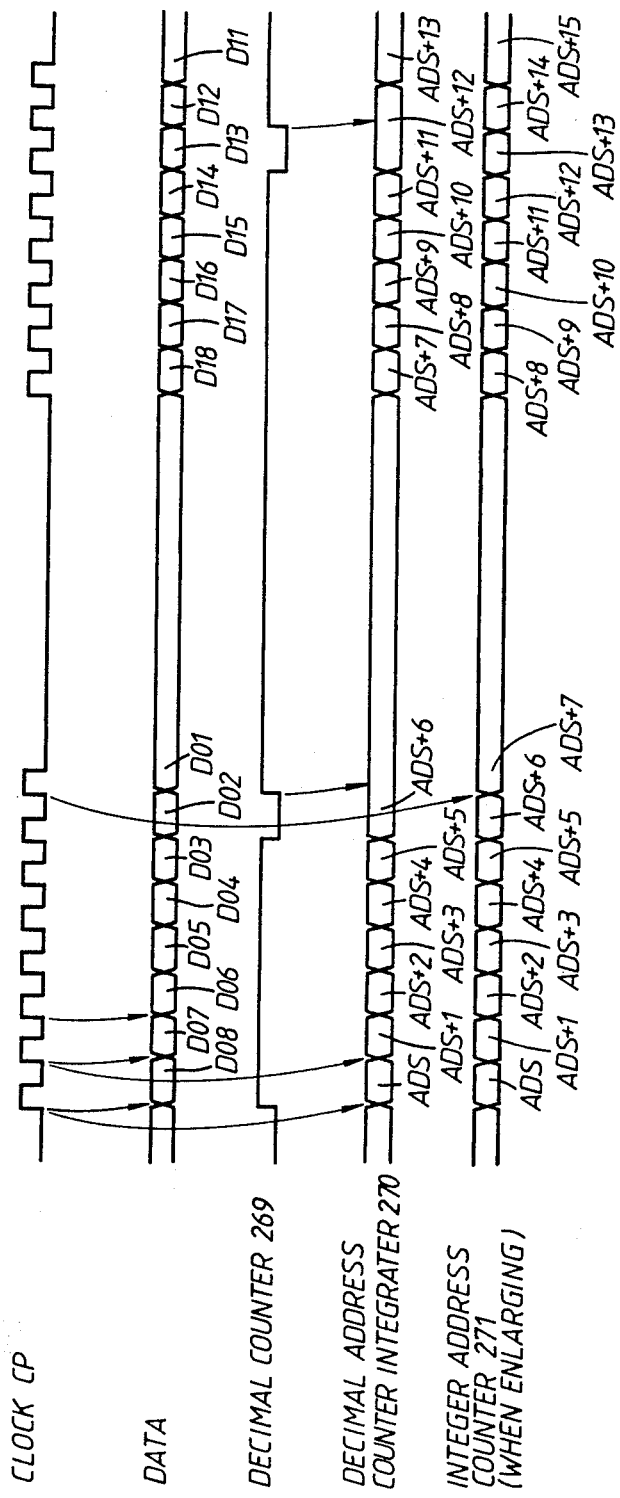
FIGS. 37(a) and 37(b) are timing charts showing the copying operation
Figure 37B:
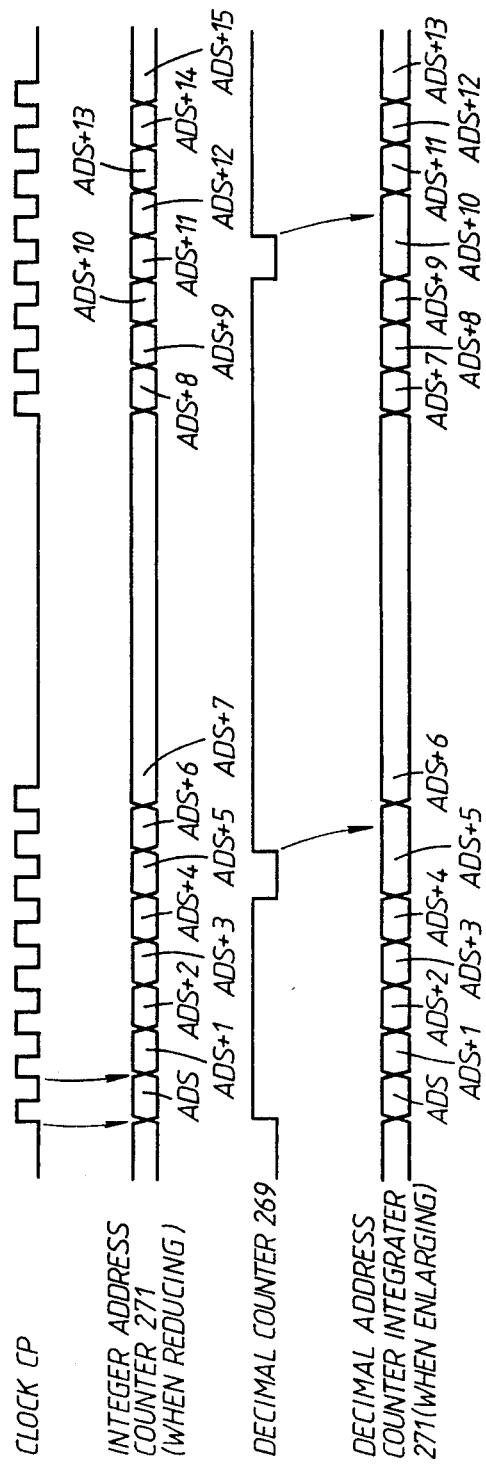

The data reduction and enlargement operations are carried out in accordance with the timing charts shown in FIGS. 37a and 37b. FIG. 37a shows the operation timing for writing data to line memories 260 and 261, and FIG. 37b shows the operation timing for reading data from line memories 260 and 261. Data D08–D01 are converted to serial data by clock CP from write timing generator 264. Also, decimal counter 269 outputs carry signals from the rising time of clock CP. For instance, it fulfills a reduction operation such as no carry signal being outputted at the 7th clock. Consequently, decimal address conter integrator 270 only selectively renews the write address in the periods when carry signals are outputted by decimal counter 269. However, when carry signals are not outputted, the write address will not be renewed and the common address ADS +6 is designated for data D02 and D01. For this reason, the same address data D02 and D01 will be successively written to the line memories, and data will be dropped by cancellation of data D02. The reading of this data is carried out by the address of integer address counter 271 which is renewed in response to clock CP, as shown in FIG. 37b. Therefore, reduced data is generated in which 1 piece of data is dropped every several pieces of data.

When the data are enlarged, as shown in FIG. 37a, writing to line memories 260 or 261 is carried out by the address of integer address counter 271 which is renewed in response to clock CP. Consequently, data D08–D01 are written to the line memories as they stand. Reading of the data from these line memories is carried out by the address of decimal address counter integrator 270. For instance, as shown in FIG. 37b, when decimal counter 269 is in an enlargement factor mode in which a carry signal is not outputted at the 6th clock CP, decimal address counter integrator 270 designates the same address (ADS +5) twice in succession without renewing the address while this carry signal is not outputted. As a result the enlargement of the data is carried out by successively reading the same data.

Incidentally, the above enlargement and reduction operations are for the case of enlargement and reduction of the image in the main scanning direction. Enlargement and reduction of the image in the secondary scanning direction can be carried out by varying the scanning speed of the carriage as described earlier. Also, when in the magnitifaction mode, a magnification signal is inputted to decimal address counter 269, and decimal address counter integrator 270 outputs the same address as that outputted by integer address counter 271. As a result, no enlargement of reduction takes place.

Next, the image extraction (trimming) in image data processor 256 is described. Trimming can extract data in the image trimming area by specifying the start position and and position of the data. Setting of the data start position is carried out by connecting the most significant bit of each read address and write address to the chip selector terminal of the memory element so that writing and reading is possible after that bit has become 1. The setting of the data end position is carried out by setting an address in address comparator 275 and controlling data selector 278, provided in the latter stage of P-S converter 262, by address comparator 275. Incidentally, this address comparator 275 operates in response to the input of an address by integer address counter 271. Consequently, when the image reduction mode and trimming are carried out together, since integer address counter 271 is used when reading data, data selector 278 which selects the data which are read is controlled by address comparator 275.

The above trimming operation is carried out in the main scanning direction, but trimming in the secondary scanning direction is carried out as follows. That is to say, secondary scanning direction parameter register 280, address counter 281, address comparator 282 and gate 283 are provided. This construction corresponds to that of the trimming block for the main scanning direction.

The most significant bit of address counter 281 is connected to gate 283 for the horizontal synchronisation signal (NHSYN) and the strobe signal (NSTB). The design is that if this bit does not become 1, neither signal is outputted to the image bus. By this means, the data start position in the scanning direction is determined.

The data end position in the secondary scanning direction is determined by setting a value corresponding to the data end position in address comparator 282. If an address above this value is counted by address counter 281, address comparator 282 will forcibly make the data zero by controlling data selector 278. Consequently, zero is written to the page buffer and trimming in the secondary scanning direction is carried out.

Figure 38:
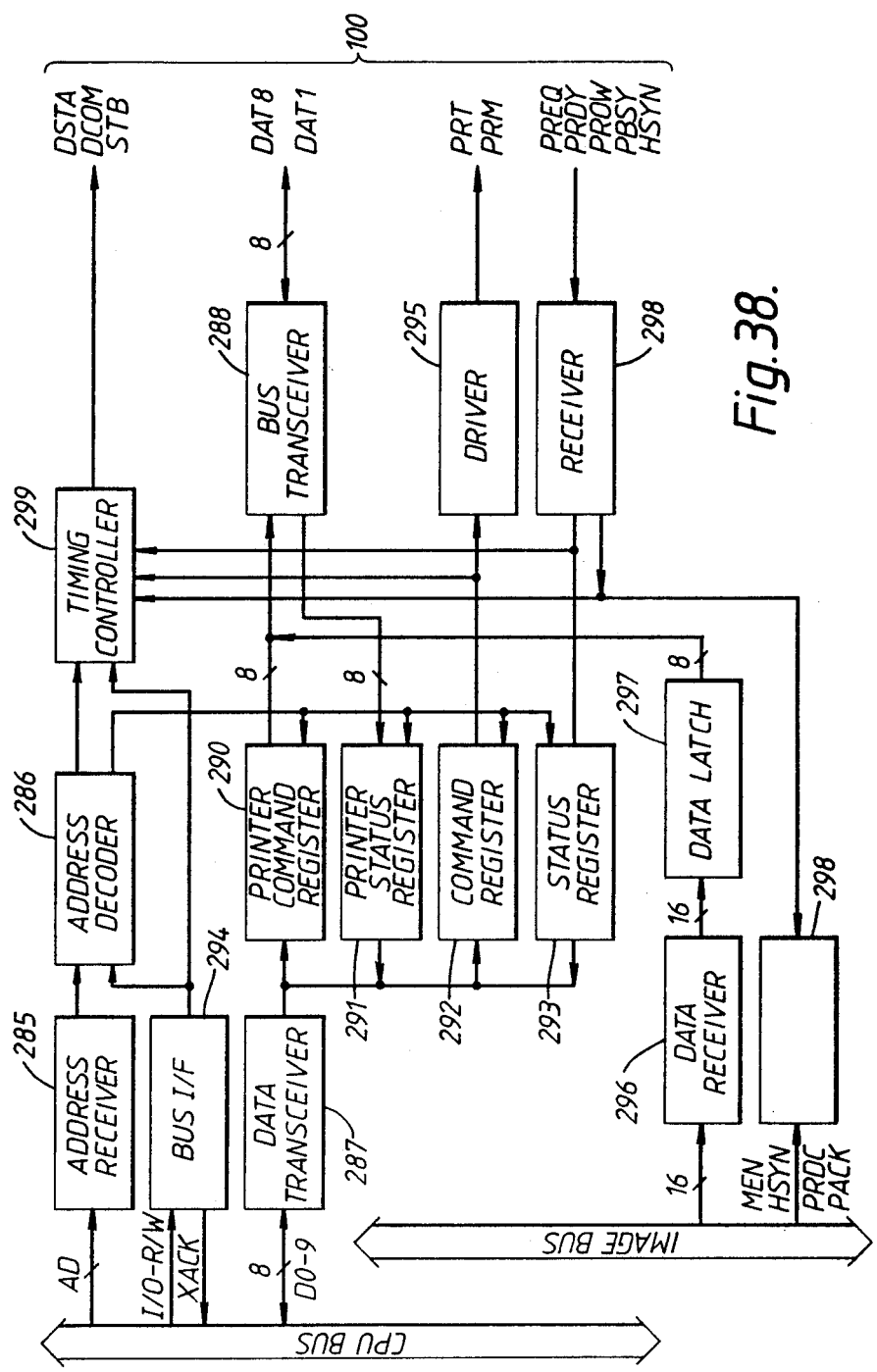
FIG. 38 is a block circuit diagram of the LBP interface.

Next, LBP interface 207 is described with reference to FIG. 38. LBP interface 207 transmits control signals from CPU 201 to LBP unit 100. At the same time it transmits the status of LBP unit 100 to CPU 201 and also transmits image data from page memory 202 to LBP unit 100. That is to say, address signals from the CPU bus are inputted to LBP interface 207 via address receiver 285 and address decoder 286, and the CPU bus data is entered in each register in accordance with these address signals. Commands are sent to LBP unit 100 or the status of LBP unit 100 is read by CPU 201 by reading the contents of each register. For the various registers, printer command register 290, printer status register 291 and command register 293 are provided. Also, the CPU bus data is inputted and outputted via data transceiver 287, and the print request signal (PREQ) and print ready signal (PRDY) from LBP unit 100 are outputted from LBP unit 100 via receiver 289.

Data DAT8–DAT1 which are exchanged between LBP interface 207 and LBP unit 100 via transceiver 288 have a bus structure and have statuses according to the 2 signal states of the signals (DSTA) and (DCOM) outputted by timing control circuit 299. That is to say, they have the 3 statuses of an LBP unit 100 status signal, a command signal to LBP unit 100 and an image signal to LBP unit 100. Timing control circuit 299, which determines any 1 of these 3 statuses, outputs various signals to LBP unit 100 based on the read/write signals from bus interface 294, command information from command register 292 and synchronous signals from transceiver 289. Also, image signals from the image bus are transmitted to LBP unit 100 via data receiver 296, data latch circuit 297 and bus transceiver 288.

Next, another embodiment of this invention is described. As shown in FIGS. 39a and 39b, it is constructed by providing a rotating shaft 1080 at one end of document presser plate 104 so that, by rotating it in the direction of arrow sign A, the back of document presser plate 104 becomes a feeder for documents D. That is to say, it can be shifted from the "Document Fixed Mode" shown in FIG. 39a to the "ADF Mode" shown in FIG. 39b by rotating document presser plate 104. A supply port is provided on the right of ADF unit 103 so that documents D can be fed in the direction of arrow sign B. By this structure, handling of dispensed documents becomes easier.

Figure 40A:
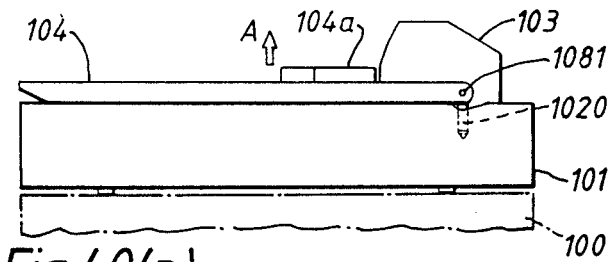
FIG. 40(a) is a side elevation showing a further embodiment of the automatic document feed device of this invention.
Figure 40B:
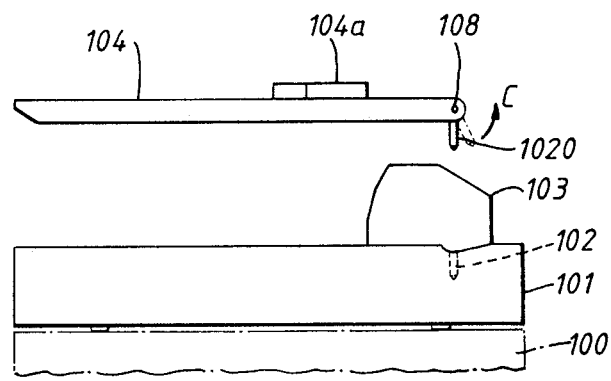
FIG. 40(b) is a side elevation illustrating the removal and replacement of the document presser plate.
Figure 40C:
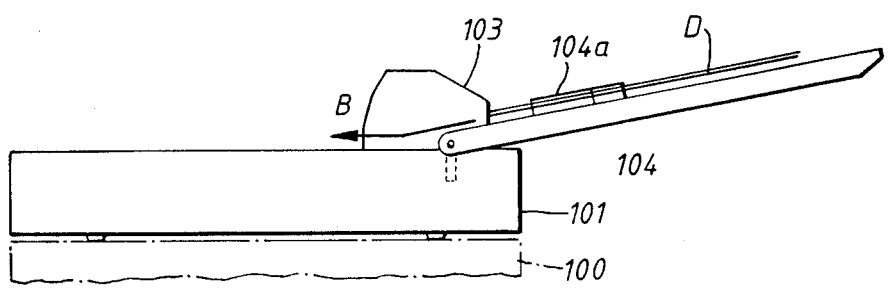
FIG. 40(c) is a side elevation of the automatic document feed device in FIG. 40(a) when in the document feed mode.

A further embodiment of this invention is described. As shown in FIGS. 40a, 40b and 40c, a pin 1020 which can rotate slightly in the direction of arrow sign C is provided on rotating shaft 1081 at one end of document presser plate 104. Also, a round hole 1021 is provided in scanner unit 101 so that pin 1020 will engage init. By this structure, to shift from the "Document Fixed Mode" shown in FIG. 40a to the "ADF MOde" shown in FIG. 40c, document presser plate 104 is separated from scanner unit 101, turned left for right and then pin 1020 is re-engaged in hole 1021. Documents D are fed in the direction of arrow sign B in the same way as in the previous embodiment so that the reading of documents D can be carried out. By this structure, handling of dispensed documents becomes easier.

Next, yet another embodiment of this invention is described.

Figure 41C:
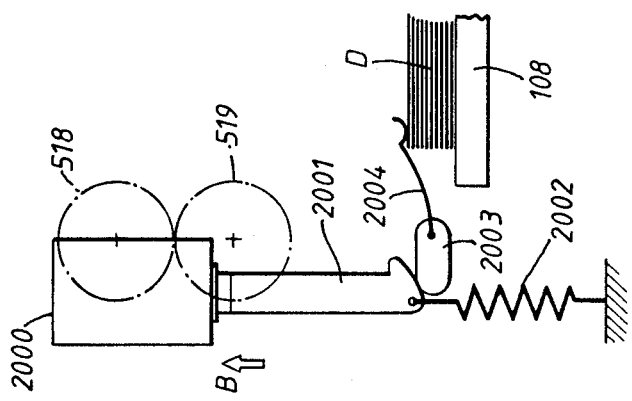
FIG. 41(c) is a side elevation showing the mechanism of the dispenser unit of the automatic document feed device when the dispense tray is full.
Figure 41B:
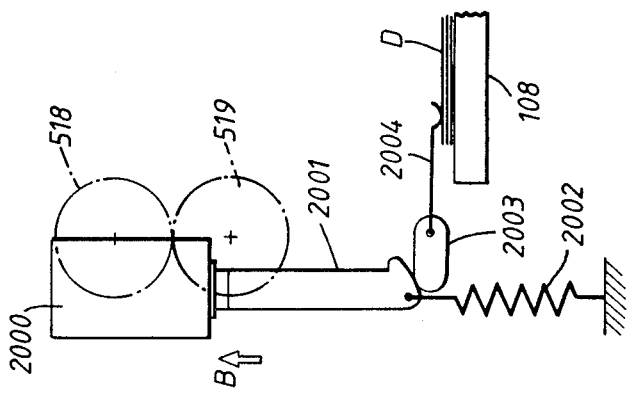
FIG. 41(b) is a side elevation showing the mechanism of the dispenser unit of the automatic document feed device when dispensing is appropriate.
Figure 41A:
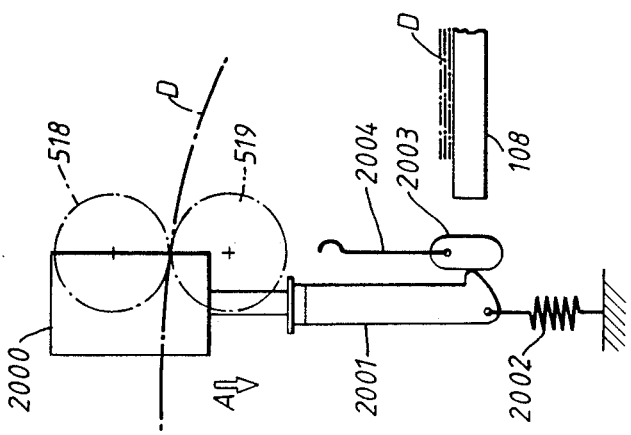
FIG. 41(a) is a side elevation showing the mechanism of the dispenser unit of the automatic document feed device of another embodiment of this invention.

Plate 2001 is connected to solenoid 2000, and when the solenoid is OFF, the state is as shown in FIG. 41a due to spring 2002. At this time, arm 2003 is pushed into a vertical position by the tip of plate 2001. When the solenoid is ON, as shown in FIG. 41b, plate 2001 is drawn in the direction of arrow sign B and arm 2003 rotates under its own weight. Arm end 2004 rests on documents D, which have been dispensed from dispense roller pair 518 and 519 on to exposure glass 108, so that the friction between documents D and exposure glass 108 is increased. Since arm end 2004 is a plate spring, even when the number of sheets of dispensed documents is increaed, it will function normally, as shown in FIG. 41c.

Since, when using this invention, the document presser plate functions as a document feed tray and a document dispense tray, there is no requirement for special feed and dispense trays. A compact and lightweight unit can therefore be achieved.

What is claimed is:

1. An image reading device comprising:
   a flat plate-shaped light transmitter having a surface on which documents are placed in a 1st image reading mode of the image reading device;
   a document presser plate having a 1st surface for pressing documents placed on the surface of the light transmitter in the 1st image reading mode and having a 2nd surface on the reverse side of the 1st surface which serves as a document feed tray for documents in a 2nd image reading mode of the image reading device;
   an image reader which reads image information on a document and converts the image information into electrical signals;
   a mode selecting means for selecting the 1st or 2nd image reading mode, wherein in the 1st image reading mode, image information on a document placed on the surface of the light transmitter is read from underneath said light transmitter by moving the image reader and the document relative to each other, and wherein in the 2nd image reading mode, the image reader is fixed and image information on a document placed on the 2nd surface of the document presser plate is read by moving the document past the image reader;
   a document transport device which moves documents placed on the 2nd surface of the document presser plate past the image reader in the 2nd image reading mode to permit the image reader to read image information on the documents; and
   a document presser plate position changing and holding unit which makes it possible to change selectively the position of the document presser plate between a position used in the 1st image reading mode and a position used in the 2nd image reading mode, and which holds the document presser plate in the selected position.

2. An image reading device according to claim 1, wherein the surface of said first plate-shaped light transmitter which constitutes a document dispenser in the 2nd image reading mode.

3. An image reading device according to claim 1, wherein said document presser plate position changing and holding unit is provided with a rotatable hinge section at one end of the document presser plate providing at least 2 fixed holding positions.

4. An image reading device according to claim 3, wherein said document presser plate position changing and holding unit is provided with a rotatable hinge section at one end of the document pressure plate having a mechanism to release the holding of the document presser plate when used in said 2nd image reading mode by rotating said document presser plate when used in said 2nd image reading mode beyond the angle at which said document presser plate is held in the 2nd image reading mode.

5. An image reading device according to claim 1, wherein said document transport device and the document presser plate are incorporated with a mechanism which holds said document presser plate at a specified angle when used in the 2nd image reading mode, and the document transport device has a supply port for feeding a document from the document feed tray and a dispense port for dispensing said document in approximately the same plane when the 2nd surface of said document presser plate is used as a document feed tray.

6. An image reading device according to claim 5, wherein said document presser plate is constructed by providing a removal mechanism by which the document transport devcie and the document presser plate, which has a hinge section, are incorporated and can be freely removed from or installed on said image reading device.

7. An image reading device according to claim 6, wherein said removal mechanism is constructed by having a shaft provided on said hinge section and a hole provided in said image reading device in which said shaft can be freely engaged and disengaged.

8. An image reading device according to claim 1, wherein the document presser plate position changing and holding unit is provided with a hinge section at one end of the document presser plate having a mechanism to hold said document presser plate when used in said 2nd image reading mode by rotating said document presser plate when used in said 2nd image reading mode to an angle at which the 1st and 2nd of said document presser plate are in reverse positions to those when the document pressure plate is used in said 1st image reading mode.

9. An image reading device according to claim 8, wherein the document transport device and the document presser plate are incorporated with the mechanism which holds said document presser plate at a specified angle when used in said 2nd image reading mode and when said document presser plate is used in the 2nd image reading mode the 1st surface of said document presser plate which faces the light transmitter in the 1st image reading mode is turned uppermost and used as the document feed tray and a feed direction for a document feed from the document feed tray by the document transport device a dispense direction for said document are approximately the same.

10. An image reading device according to claim 8, wherein said document presser plate is constructed so that shafts provided on the document presser plate and holes provided in said image reading device in which said shafts engage can be freely engaged and disengaged, and when used in said 2nd image reading mode, said shafts are disengaged from said holes and the direction in which said document presser plate faces is changed without reversing the 1st and 2nd surfaces of the document presser plate by re-engaging said shafts in said holes.

11. An image reading device according to 1, wherein said document presser plate is provided with a document feed guide on the 2nd surface.

12. An image reading device according to claim 11, wherein to said document presser plate provided with a document feed guide is attached a detector which detects the size of a document fed past said document feed guide by said document transport device.

13. An image reading device according to claim 1, further including means for increasing the friction between stacked documents which have been dispensed from the documents transport device.

14. An image reading device according to claim 13, wherein said friction-increasing means is constructed with a component which butts against said stacked documents and which is operated by the force of a document being dispensed from the document transport device.

15. An image reading device according to claim 14, wherein the component which butts against said stacked documents is acted on by gravity, thereby increasing the friction between the stacked documents.

16. An image reading device according to claim 13, wherein said friction-increasing means is constructed with a solenoid, spring means which butts against said stacked documents when the solenoid is energized, and an arm portion to which the spring means is attached and which acts under gravitation to allow the spring means to butt against the stacked documents when the solenoid is energized.

17. An image reading device according to claim 1, further including means for sloping said light transmitter when its surface is used as a document dispenser in the 2nd image reading mode.

18. An image reading device according to claim 17, wherein said sloping means comprises a rotatable mechanism on one end of said light transmitter and a cam mechanism which slopes the light transmitter by moving its other end up and down vertically.

19. An image reading device according to claim 17, wherein said sloping means comprises a cam mechanism which moves said light transmitter to slope it, a bellows provided at a document dispensing end of the light transmitter, and a rotatable portion provided on the light transmitter at a distance from the dispensing end.

20. An image reading device according to claim 17, wherein said sloping means comprises a rotatable portion and a bellows provided at a document dispensing end of said light transmitter and a cam mechanism which moves the light transmitter up and down vertically to slope it provided at a distance from the dispensing end.

* * * * *